(12) United States Patent
Holland et al.

(10) Patent No.: US 12,212,859 B2
(45) Date of Patent: Jan. 28, 2025

(54) LOW-POWER FUSION FOR NEGATIVE SHUTTER LAG CAPTURE

(71) Applicant: QUALCOMM Incorporated, San Diego, CA (US)

(72) Inventors: Wesley James Holland, Encinitas, CA (US); Micha Galor Gluskin, San Diego, CA (US); Venkata Ravi Kiran Dayana, San Diego, CA (US); Upal Mahbub, Santee, CA (US); Scott Barker, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/467,563

(22) Filed: Sep. 14, 2023

(65) Prior Publication Data
US 2024/0007760 A1 Jan. 4, 2024

Related U.S. Application Data

(63) Continuation of application No. 17/476,283, filed on Sep. 15, 2021, now Pat. No. 11,800,242.

(51) Int. Cl.
*H04N 23/951* (2023.01)
*G06T 3/4053* (2024.01)
*H04N 23/68* (2023.01)

(52) U.S. Cl.
CPC ......... *H04N 23/951* (2023.01); *G06T 3/4053* (2013.01); *H04N 23/6811* (2023.01); *H04N 23/6815* (2023.01); *H04N 23/6812* (2023.01)

(58) Field of Classification Search
CPC ............. H04N 23/951; H04N 23/6811; H04N 23/6815; H04N 23/6812; H04N 23/80; G06T 3/4053
See application file for complete search history.

(56) References Cited

U.S. PATENT DOCUMENTS

| | | |
|---|---|---|
| 2011/0164147 A1 | 7/2011 | Takahashi et al. |
| 2016/0357400 A1 | 12/2016 | Penha et al. |
| 2023/0080803 A1 | 3/2023 | Holland et al. |

FOREIGN PATENT DOCUMENTS

| | | |
|---|---|---|
| CN | 111402130 A | 7/2020 |
| CN | 112954251 A | 6/2021 |

OTHER PUBLICATIONS

International Search Report and Written Opinion—PCT/US2022/074742—ISA/EPO—Nov. 23, 2022.

*Primary Examiner* — Twyler L Haskins
*Assistant Examiner* — Angel L Garces-Rivera
(74) *Attorney, Agent, or Firm* — Polsinelli//Qualcomm Incorporated

(57) ABSTRACT

Systems and techniques are provided for processing one or more frames. For example, a process can include obtaining a first plurality of frames associated with a first settings domain from an image capture system, wherein the first plurality of frames is captured prior to obtaining a capture input. The process can include obtaining a reference frame associated with a second settings domain from the image capture system, wherein the reference frame is captured proximate to obtaining the capture input. The process can include obtaining a second plurality of frames associated with the second settings domain from the image capture system, wherein the second plurality of frames is captured after the reference frame. The process can include, based on the reference frame, transforming at least a portion of the first plurality of frames to generate a transformed plurality of frames associated with the second settings domain.

25 Claims, 20 Drawing Sheets

LOW-POWER FUSION FOR NEGATIVE SHUTTER LAG CAPTURE

CROSS-REFERENCE TO RELATED APPLICATIONS

This application is a continuation of U.S. Non-Provisional application Ser. No. 17/476,283, filed on Sep. 15, 2021, which is hereby incorporated by reference, in its entirety and for all purposes.

FIELD

The present disclosure generally relates to the capture of images and/or video, and more specifically to systems and techniques for performing negative shutter lag capture

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

Devices (e.g., mobile devices) and systems are increasingly leveraging specialized ultra-low power camera hardware for "always-on" (AON) camera use cases where a camera can remain on to continuously record while maintaining a lower power usage footprint. The AON camera can capture images or video of unexpected events where a user may be unable to initiate video recording prior to the event occurring. However, the overall power consumption of AON camera setups capturing images or video can nevertheless significantly reduce the battery life of mobile devices, which generally have a limited battery life AON. In some cases, AON camera setups can leverage low power camera hardware for reduced power consumption.

BRIEF SUMMARY

In some examples, systems and techniques are described for providing a negative shutter lag video and/or image capture. According to at least one illustrative example, a method is provided for processing one or more frames. The method includes: obtaining a first plurality of frames associated with a first settings domain from an image capture system, wherein the first plurality of frames is captured prior to obtaining a capture input; obtaining at least one reference frame associated with a second settings domain from the image capture system, wherein the at least one reference frame is captured proximate to obtaining the capture input; obtaining a second plurality of frames associated with the second settings domain from the image capture system, wherein the second plurality of frames is captured after the at least one reference frame; based on the at least one reference frame, transforming at least a portion of the first plurality of frames to generate a transformed plurality of frames associated with the second settings domain.

In another example, an apparatus for processing one or more frames is provided that includes at least one memory (e.g., configured to store data, such as virtual content data, one or more images, etc.) and one or more processors (e.g., implemented in circuitry) coupled to the at least one memory. The one or more processors are configured to and can: obtain a first plurality of frames associated with a first settings domain from an image capture system, wherein the first plurality of frames is captured prior to obtaining a capture input; obtain at least one reference frame associated with a second settings domain from the image capture system, wherein the at least one reference frame is captured proximate to obtaining the capture input; obtain a second plurality of frames associated with the second settings domain from the image capture system, wherein the second plurality of frames is captured after the at least one reference frame; based on the at least one reference frame, transform at least a portion of the first plurality of frames to generate a transformed plurality of frames associated with the second settings domain.

In another example, a non-transitory computer-readable medium is provided that has stored thereon instructions that, when executed by one or more processors, cause the one or more processors to: obtain a first plurality of frames associated with a first settings domain from an image capture system, wherein the first plurality of frames is captured prior to obtaining a capture input; obtain at least one reference frame associated with a second settings domain from the image capture system, wherein the at least one reference frame is captured proximate to obtaining the capture input; obtain a second plurality of frames associated with the second settings domain from the image capture system, wherein the second plurality of frames is captured after the at least one reference frame; based on the at least one reference frame, transform at least a portion of the first plurality of frames to generate a transformed plurality of frames associated with the second settings domain.

In another example, an apparatus for processing one or more frames is provided. The apparatus includes: means for obtaining a first plurality of frames associated with a first settings domain from an image capture system, wherein the first plurality of frames is captured prior to obtaining a capture input; means for obtaining at least one reference frame associated with a second settings domain from the image capture system, wherein the at least one reference frame is captured proximate to obtaining the capture input; means for obtaining a second plurality of frames associated with the second settings domain from the image capture system, wherein the second plurality of frames is captured after the at least one reference frame; means for, based on the at least one reference frame, transforming at least a portion of the first plurality of frames to generate a transformed plurality of frames associated with the second settings domain.

In some aspects, the first settings domain comprises a first resolution and the second settings domain comprises a second resolution. In some cases, to transform at least the portion of the first plurality of frames, the method, apparatuses, and computer-readable medium described above can comprise upscaling at least the portion of the first plurality of frames from the first resolution to the second resolution to generate the transformed plurality of frames, wherein the transformed plurality of frames have the second resolution.

In some aspects, the method, apparatuses, and computer-readable medium described above can further comprising: obtaining an additional reference frame having the second resolution from the image capture system, wherein the additional reference frame is captured prior to obtaining the capture input, generating the upscaled plurality of frames having the second resolution is based on at least the portion of the first plurality of frames, the at least one reference frame, and the additional reference frame, and wherein the at least one reference frame provides a reference for upscaling at least a first portion of at least the portion of the first plurality of frames and the additional reference frame provides a reference for upscaling at least a second portion of at least the portion of the first plurality of frames.

In some aspects, the method, apparatuses, and computer-readable medium described above can further comprise: combining the transformed plurality of frames and the second plurality of frames to generate a video associated with the second settings domain.

In some aspects, the method, apparatuses, and computer-readable medium described above can further comprise: obtaining motion information associated with the first plurality of frames, wherein generating the transformed plurality of frames associated with the second settings domain is based on at least the portion of the first plurality of frames, the at least one reference frame, and the motion information.

In some aspects, the method, apparatuses, and computer-readable medium described above can further comprise: determining a panning direction based on the motion information associated with the first plurality of frames; applying the panning direction to the transformed plurality of frames.

In some aspects, the first settings domain comprises a first framerate and the second settings domain comprises a second framerate. In some cases, In some cases, to transform at least the portion of the first plurality of frames, the method, apparatuses, and computer-readable medium described above can comprise framerate converting at least the portion of the first plurality of frames from the first framerate to the second framerate.

In some aspects, a first subset of the first plurality of frames is captured at the first framerate and a second subset of the first plurality of frames is captured at a third framerate, different from the first framerate. In some cases, the third framerate is equal to or not equal to the second framerate. In some aspects, a change between the first framerate and the third framerate is based at least in part on motion information associated at least one of the first subset of the first plurality of frames and the second subset of the first plurality of frames.

In some aspects, the first settings domain comprises a first resolution and a first framerate and the second settings domain comprises a second resolution and a second framerate. In some cases, In some cases, to transform at least the portion of the first plurality of frames, the method, apparatuses, and computer-readable medium described above can comprise upscaling at least the portion of the first plurality of frames from the first resolution to the second resolution and framerate converting at least the portion of the first plurality of frames from the first framerate to the second framerate.

In some aspects, the method, apparatuses, and computer-readable medium described above further comprise: obtaining an additional reference frame associated with the second settings domain from the image capture system, wherein the additional reference frame is captured prior to obtaining the capture input, wherein generating the transformed plurality of frames associated with the second settings domain is based on at least the portion of the first plurality of frames, at least one reference frame, and the additional reference frame, and wherein the at least one reference frame provides a reference for transforming at least a first subset of at least the portion of the first plurality of frames and the additional reference frame provides a reference for transforming at least a second subset of at least the portion of the first plurality of frames.

In some aspects, the method, apparatuses, and computer-readable medium described above further comprise: obtaining a second reference frame associated with the second settings domain from the image capture system, wherein the second reference frame is captured proximate to obtaining the capture input; based on the first reference frame, transforming at least the portion of the first plurality of frames to generate the transformed plurality of frames associated with the second settings domain; and based on the second reference frame, transforming at least another portion of the first plurality of frames to generate a second transformed plurality of frames associated with the second settings domain.

In some aspects, the method, apparatuses, and computer-readable medium described above further comprise: obtaining a motion estimate associated with the first plurality of frames; obtaining a third reference frame associated with the second settings domain from the image capture system, wherein the third reference frame is captured prior to obtaining the capture input; and based on the third reference frame, transforming a third portion of the first plurality of frames to generate a third transformed plurality of frames associated with the second settings domain; wherein an amount of time between the first reference frame and the third reference frame is based on the motion estimate associated with the first plurality of frames.

In some aspects, the first settings domain comprises at least one of a first resolution, a first framerate, a first color depth, a first noise reduction technique, a first edge enhancement technique, a first image stabilization technique, and a first color correction technique, and the second settings domain comprises at least one of a second resolution, a second framerate, a second color depth, a second noise reduction technique, a second edge enhancement technique, a second image stabilization technique, and a second color correction technique.

In some aspects, the method, apparatuses, and computer-readable medium described above further comprise: generating the transformed plurality of frames using a trainable neural network, wherein the neural network is trained using a training dataset comprising pairs of images, each pair of images including a first image associated with the first settings domain and a second image associated with the second settings domain.

In some aspects, capturing the at least one reference frame proximate to obtaining the capture input comprises capturing a first available associated with the second settings domain after the capture input is received, capturing a second available frame associated with the second settings domain after the capture input is received, capturing a third available frame associated with the second settings domain after the capture input is received, or capturing a fourth available frame associated with the second settings domain after the capture input is received.

In some aspects, capturing the at least one reference frame proximate to obtaining the capture input comprises capturing a frame associated with the second settings domain within 10 millisecond (ms), within 100 ms, within 500 ms, or within 1000 ms after the capture input is received.

According to at least one other example, a method is provided for processing one or more frames. The method includes: obtaining a first plurality of frames associated with a first settings domain from an image capture system, wherein the first plurality of frames is captured prior to obtaining a capture input; obtaining a reference frame associated with a second settings domain from the image capture system, wherein the reference frame is captured proximate to obtaining the capture input; obtaining a selection of one or more selected frames associated with the first plurality of frames; based on the reference frame, transforming the one or more selected frames to generate one or more transformed frames associated with the second settings domain.

In another example, an apparatus for processing one or more frames is provided that includes at least one memory (e.g., configured to store data, such as virtual content data, one or more images, etc.) and one or more processors (e.g., implemented in circuitry) coupled to the at least one memory. The one or more processors are configured to and can: obtain a first plurality of frames associated with a first settings domain from an image capture system, wherein the first plurality of frames is captured prior to obtaining a capture input; obtain a reference frame associated with a second settings domain from the image capture system, wherein the reference frame is captured proximate to obtaining the capture input; obtain a selection of one or more selected frames associated with the first plurality of frames; based on the reference frame, transform the one or more selected frames to generate one or more transformed frames associated with the second settings domain.

In another example, a non-transitory computer-readable medium is provided that has stored thereon instructions that, when executed by one or more processors, cause the one or more processors to: obtain a first plurality of frames associated with a first settings domain from an image capture system, wherein the first plurality of frames is captured prior to obtaining a capture input; obtain a reference frame associated with a second settings domain from the image capture system, wherein the reference frame is captured proximate to obtaining the capture input; obtain a selection of one or more selected frames associated with the first plurality of frames; based on the reference frame, transform the one or more selected frames to generate one or more transformed frames associated with the second settings domain.

In another example, an apparatus for processing one or more frames is provided. The apparatus includes: means for obtaining a first plurality of frames associated with a first settings domain from an image capture system, wherein the first plurality of frames is captured prior to obtaining a capture input; means for obtaining a reference frame associated with a second settings domain from the image capture system, wherein the reference frame is captured proximate to obtaining the capture input; means for obtaining a selection of one or more selected frames associated with the first plurality of frames; means for, based on the reference frame, transforming the one or more selected frames to generate one or more transformed frames associated with the second settings domain.

In some aspects, selection of one or more selected frames is based on a selection from a user interface.

In some aspects, the user interface comprises a thumbnail gallery, a slider, or a frame-by-frame review.

In some aspects, the method, apparatuses, and computer-readable medium described above further comprise: determining one or more suggested frames from the first plurality of frames based on one or more of determining whether an amount of motion or amount of change in motion exceeds a threshold, determining which frames contain interesting content based on a presence of one or more human faces, and determining which frames contain content similar to a set of labeled set of images.

In some aspects, one or more of the apparatuses described above is or is part of a vehicle (e.g., a computing device of a vehicle), a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatuses, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
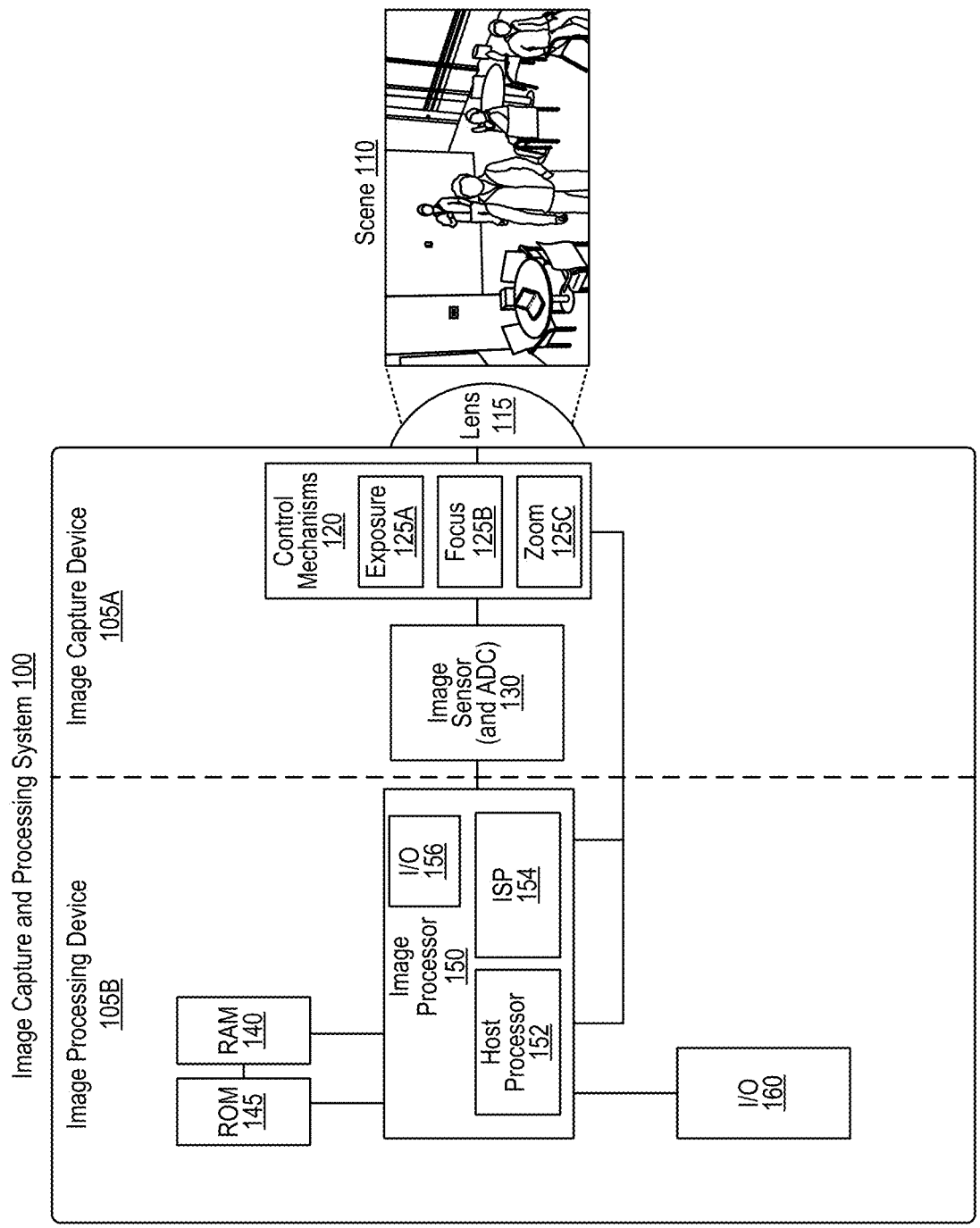
FIG. 1 is a block diagram illustrating an architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Systems and techniques are described herein for providing a negative shutter lag video and/or image capture system. In some examples, an image capture system can implement a lower-power or "always-on" (AON) camera that persistently or periodically operates to automatically detect certain objects in an environment. For instance, an image capture system that can capture video with an AON camera can be useful in situations where the AON camera is always pointed toward a target of interest. For example, one or more cameras included in a head-mounted device (e.g., virtual reality (VR) or augmented reality (AR) head-mounted display (HMD), AR glasses, etc.) can always be pointed where a user is looking, based on movement of the user's head. While examples are described herein with reference to an AON camera, such aspects can be applied to any camera or image sensor that operate in a low-power mode.

In some cases, the AON camera can leverage low power camera hardware for reduced power consumption. In some cases, the AON camera can operate with low power settings and/or perform different or fewer image processing steps for reduced power consumption. The amount of power consumed by the AON camera can depend upon the domain (also referred to herein as a settings domain) of the image and/or video frame capture. In some cases, the domain of an AON camera capturing images and/or video frames can include configuration parameters (e.g., resolution, framerate, color depth, or the like), and/or other parameters of the AON camera. In some cases, the domain can further include the processing steps (e.g., noise reduction, edge enhancement, image stabilization, color correction, or the like) performed on the captured images and/or video frames by a camera pipeline of the AON camera. In some cases, after a user initiates a video and/or image capture, a non-AON camera can capture a still image or begin capturing video frames. The non-AON camera can utilize higher power camera hardware and/or can operate with higher power settings and/or different or more image processing steps as compared to an AON or other low-power camera.

It should be understood that while specific examples of the disclosure are discussed in terms of an AON camera (or AON camera sensor) and a main camera (or main camera sensor), the systems and techniques described herein can be applied to many different camera or sensor configurations without departing from the scope of the present disclosure. In one illustrative example, a single camera or sensor can be configured to operate with different operating modes (e.g., a low power AON mode and a non-AON mode). References to "AON operation" herein can be understood to include capturing images and/or frames with one or more AON cameras and/or operating one or more cameras in an AON mode. In the present disclosure, frames (e.g., video frames or images) captured during AON operation are sometimes referred to as low power frames (e.g., low power video frames). Similarly, references to "standard operation" can be understood to include capturing frames with one or more non-AON cameras and/or one or more cameras operating in a non-AON mode. In addition, non-AON cameras or sensors and/or cameras or sensors operating in a non-AON mode can sometimes be referred to as one or more "main cameras" or "main camera sensors". In the present disclosure, frames (e.g., video frames) captured during standard camera operation are sometimes referred to as high power frames (e.g., high power video frames). The systems and techniques will be described herein as being performed with respect to video frames. However, it will be understood that the systems and techniques can operate using any sequence of images or frames, such as consecutively captured still images.

A user can initiate an image and/or video capture by, for example, pressing a capture or record button (also referred to as a shutter button in some cases), performing a gesture, and/or any other method of providing a capture input. The time that the image capture system receives the capture input can be defined as time t=0. Video frames captured during AON operation (e.g., at time t<0) can be stored in memory (e.g., a buffer, circular buffer, video memory, or the like) that maintains captured video frames for a period of time (e.g., 30 seconds, 1 minute, 5 minutes, etc.). The frames captured during the AON operation can be associated with a first settings domain (hereinafter also referred to as a first domain). In one illustrative example, the first settings domain can include a wide video graphics array (WVGA) resolution (e.g., 800 pixels×480 pixels) and a framerate of 30 frames per second (fps).

After the image capture system receives the capture input, the image capture system can begin capturing video frames in standard operation. In some cases, video frames captured during standard operation can be associated with a second settings domain (hereinafter also referred to as a second domain), different from the first settings domain. In one illustrative example, the second settings domain can include an ultra-high definition (UHD) resolution (e.g., 3840 pixels×2160 pixels) and a framerate of 30 fps. The frames captured during standard operation can include capturing a keyframe (also referred to as a reference frame herein) associated with the second settings domain (e.g., with the UHD resolution) at or proximate to t=0. As an illustrative example, capturing a keyframe proximate to the capture input can include capturing the first available frame associated with the second settings domain after the capture input is received. In some cases, capturing a keyframe proximate to the capture input can include capturing the second frame, third frame, fourth frame, or fifth frame, or any other suitable available frame associated with the second settings domain after the capture input is received. In some cases, capturing a keyframe proximate to the capture input can include capturing a frame associated with the second settings domain within 10 millisecond (ms), within 100 ms, within 500 ms, within 1000 ms, or within any other suitable time window after the capture input is received. If the capture input occurs in response to an unexpected event (e.g., a child scoring a goal in soccer, a pet performing a trick, etc.), the capture input may occur after the event the user is interested in capturing (e.g., time t<0). In some cases, the image processing system may have captured the event during AON operation. In some cases, the video frames captured during AON operation associated with the first domain can have a significantly different appearance (e.g., different resolution, framerate, color depth, sharpness, etc.) than video frames associated with the second domain and captured during standard operation. In some cases, using the keyframe as a guide, the video frames captured during AON operation associated with the first domain can be transformed to the second settings domain. In one illustrative example, transforming video frames from the first settings domain to the second settings domain can include resolution scaling, framerate scaling, changing color depth, and/or other transformations described herein. In some cases, a composite (or stitched) video can be formed from the transformed video frames associated with the second settings domain and the video frames associated with the second settings domain captured after receiving the capture input.

The process of transforming video frames from the first domain to the second domain using a keyframe can be referred to as a domain transform or guided domain transform. In some cases, a deep learning neural network (e.g., a domain transform model) can be trained to perform the guided domain transform at least in part by converting a first portion of video frames associated with the second domain (e.g., from a video included in a training data set) to the first domain, providing a keyframe associated with the second domain from the original video, and transforming the first portion of video frames back to the second domain using the keyframe as a guide. The resulting transformed video frames can be directly compared to the original video frames and a loss function can be used to determine an amount of error between the transformed video frames and the original frames. The parameters (e.g., weights, biases, etc.) of the deep learning network can be adjusted (or tuned) based on the error. Such a training process can be referred to as supervised learning using backpropagation, which can be performed until the tuned parameters provide a desired result. In some cases, the domain transform model can be trained utilizing a deep generative neural network model (e.g., generative adversarial network (GAN)).

In some cases, AON operation can include capturing video frame data at a low resolution (e.g., VGA resolution of 640 pixel×480 pixels or WVGA resolution). In some cases, standard operation can include capturing video data at a higher resolution than AON operation (e.g., 720p, 1080i, 1080p, 4K, 8K or the like). Capturing and processing video data at the lower resolution during AON operation can consume less power than capturing and processing video data at the higher resolution during standard operation. For example, the amount of power required to read the video frame data captured by the image capture system can increase as the number of pixels read out increases. In addition, the amount of power required for image post-processing of the captured video frames data can also increase as the number of pixels in the video frames increase. In some cases, the low resolution video frames can be upscaled to the higher resolution. The example of a low resolution capture during AON operation and higher resolution capture during standard operation described above provides one illustrative example of different domains that can be used for capturing video frames in a negative shutter lag system.

The process of upscaling using a high resolution keyframe can be referred to as a guided super-resolution process. A guided super-resolution process is an illustrative example of a guided domain transform. In some cases, a deep learning neural network (e.g., a guided super-resolution model) can be trained to perform the guided super-resolution process in a training process similar to the process for training a domain transform model described above. For example, the guided super resolution model can be trained at least in part by downscaling a portion of video frames from a high resolution video (e.g., a video included in a training data set), providing a high resolution keyframe from the high resolution video, and upscaling the downscaled portion of the video frames from the high resolution video back to the original resolution using the high resolution keyframe as a guide. The upscaled video frames can be directly compared to the original high resolution video frames and a loss function can be used to determine an amount of error between the upscaled video frames and the original high resolution video frames of the video. The parameters (e.g., weights, biases, etc.) of the deep learning network can be adjusted (or tuned) based on the error. Such a training process can be referred to as supervised learning using backpropagation, which can be performed until the tuned parameters provide a desired result. In some cases, the guided super-resolution model can be trained utilizing a GAN.

In some cases, the image capture system operating in the AON mode can capture video having a lower framerate than the video captured during the high resolution mode. By reducing the framerate and/or resolution during the AON mode, the image capture system can operate with lower power consumption during the AON mode when compared to the high resolution mode. In some cases, additional power can be saved in the AON mode by utilizing an adaptive framerate. In some implementations, the image capture system can utilize inertial motion estimation from an inertial sensor to determine an amount of motion of the image capture system (e.g., motion of a head mounted device). In some implementations, the image capture system can perform optical motion estimation (e.g., by analyzing the captured video frames) to determine the amount of motion of the image capture system. If the image capture system is still or has only a small amount of motion, the framerate for capturing video frames can be set to a lower framerate setting (e.g., to 15 fps). On the other hand, if the image capture system and/or the scene being captures has a large amount of motion, the framerate for capturing video frames during AON operation can be set to a high framerate setting (e.g., 30 fps, 60 fps). In some cases, the maximum framerate during the AON mode can be equal to the framerate setting for the high resolution mode. In some cases, in addition to storing the video frames in memory during the AON mode, information indicating the framerate at which the video frames were captured can also be stored.

In some implementations, in addition to capturing a keyframe at the moment a capture input is received (e.g., at t=0) or proximate to the capture input, the image capture system can capture additional high resolution keyframes periodically during AON operation. As an illustrative example, capturing a keyframe proximate to the capture input can include capturing the first available high resolution frame after the capture input is received. In some cases, capturing a keyframe proximate to the capture input can include capturing the second, third, fourth, or fifth high resolution available frame after the capture input is received. In some cases, capturing a keyframe proximate to the capture input can include capturing a high resolution frame within 10 ms, within 100 ms, within 500 ms, within 1000 ms, or within any other suitable time window after the capture input is received. For example, a keyframe can be captured every half second, every second, every five seconds, every ten seconds, or any other suitable duration. The additional high resolution keyframes captured during AON operation can be stored in memory (e.g., a buffer) along with the low resolution video frames. Each high resolution keyframe that is captured can be used as a guide for video frames captured during AON operation that are close in time to the keyframe. In some cases, the additional high resolution keyframes can improve the guided super-resolution process where the image capture system is moving over time and/or objects in the scene are moving over time. By periodically capturing high resolution keyframes, the scene captured in each keyframe is more likely to capture at least a portion of the same scene captured during AON operation within a certain time period (e.g., within half a second, one second, five seconds, or ten seconds). In some cases, the capture rate for high resolution keyframes can be determined based on an amount of motion of the image capture system. In some cases, the amount of motion can be determined based on readings from an inertial motion sensor and/or from performing optical motion detection on the video frames captured during AON operation.

In some cases, inertial sensor data can also be stored in memory along with video frames captured during the AON mode and utilized in the guided super-resolution process. For example, if data from the inertial sensors captured during the AON mode indicates the image capture system was moving to the left, the guided super-resolution can utilize the information about the motion in the scene to ensure that, for example, the video that it outputs pans to the left appropriately to match the measured motion.

While specific example domain transforms (e.g., resolution upscaling, framerate adjustment, and color depth adjustment) are described herein for performing negative shutter lag capture, the systems and techniques described herein can be used to perform negative shutter lag capture with other domain transforms without departing from the scope of the present disclosure. For example, a negative shutter lag system can capture monochrome video frames during AON operation and color video frames during standard operation. In such an example, the domain transform can include colorizing the monochrome frames.

Various aspects of the techniques described herein will be discussed below with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by the image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 130) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1910 discussed with respect to the computing system 1900. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using a MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1925, read-only memory (ROM) 145/1920, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1935, any other input devices 1945, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral devices and/or transmit data to the one or more peripheral devices. The I/O 160 may include one or more wireless transceivers that enable a wireless connection between the system 100 and one or more peripheral devices, over which the system 100 may receive data from the one or more peripheral devices and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
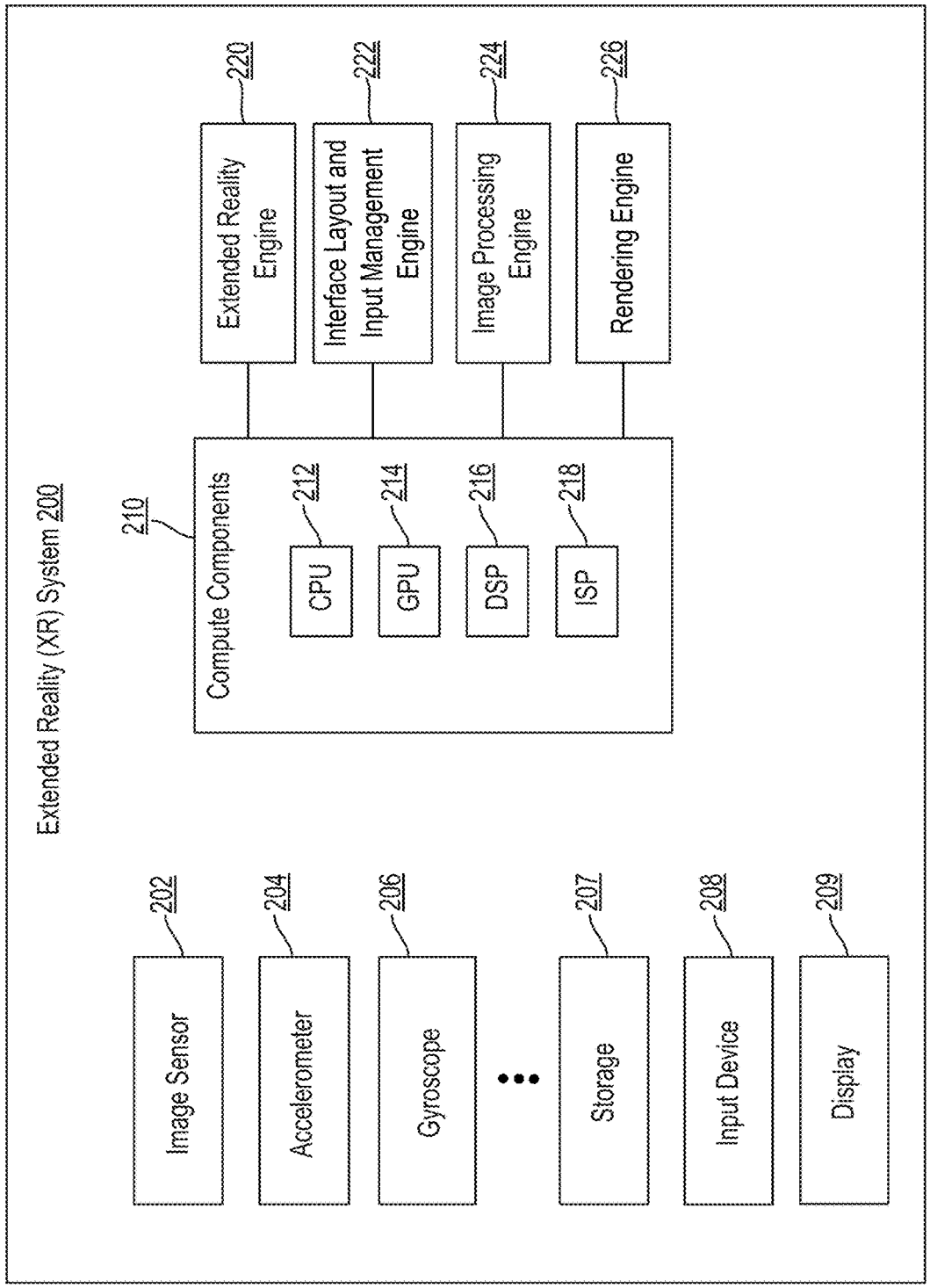
FIG. 2 is a diagram illustrating an architecture of an example extended reality (XR) system, in accordance with some examples.

In some examples, the extended reality (XR) system 200 of FIG. 2 can include the image capture and processing system 100, the image capture device 105A, the image processing device 105B, or a combination thereof.

FIG. 2 is a diagram illustrating an architecture of an XR system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an interface layout and input management engine 222, an image processing engine 224, and a rendering engine 226. It should be noted that the components 202-226 shown in FIG. 2 are non-limiting examples provided for illustrative and explanation purposes, and other examples can include more, less, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse, a button or key, a microphone for receiving voice commands, a gesture input device for receiving gesture commands, a video game controller, a steering wheel, a joystick, a set of buttons, a trackball, a remote control, any other input device 1945 discussed herein, or any combination thereof. In some cases, the image sensor 202 can capture images that can be processed for interpreting gesture commands.

In some implementations, the one or more image sensors 202, the accelerometer 204, the gyroscope 206, storage 207, compute components 210, XR engine 220, interface layout and input management engine 222, image processing engine 224, and rendering engine 226 can be part of the same computing device. For example, in some cases, the one or more image sensors 202, the accelerometer 204, the gyroscope 206, storage 207, compute components 210, XR engine 220, interface layout and input management engine 222, image processing engine 224, and rendering engine 226 can be integrated into a head-mounted display (HMD), extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, interface layout and input management engine 222, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the interface layout and input management engine 222, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the interface layout and input management engine 222, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the interface layout and input management engine 222, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the interface layout and input management engine 222, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or framerate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the object detected by the image sensor 202). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown). SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, keyframes can be selected from input images or a video stream to represent an observed scene. For every keyframe, a respective 6DoF camera pose associated with the keyframe can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each keyframe. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in keyframes either match (are the same or correspond to) or fail to match the feature points of previously-captured input images or keyframes. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or keyframe, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
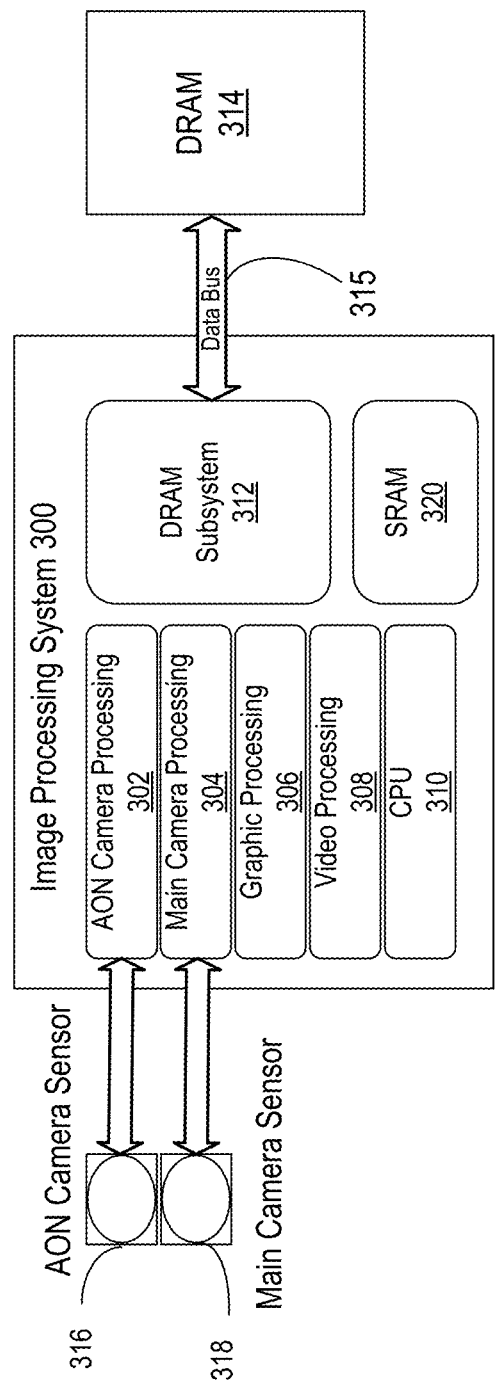
FIG. 3 is a block diagram illustrating an example image processing system, in accordance with some examples.

FIG. 3 illustrates an example block diagram of an image processing system 300. In some cases, the image processing system 300 can include, or can be included in, an image capture and processing system 100, an image capture device 105A, an image processing device 105B, an XR system 200, portions thereof, or any combination thereof. In the illustrative example of FIG. 3, the image processing system 300 includes AON camera processing subsystem 302, a main camera processing subsystem 304, a graphic processing subsystem 306, a video processing subsystem 308, a central processing unit (CPU) 310, a DRAM subsystem 312, and an SRAM 320.

In some implementations, the AON camera processing subsystem 302 can receive inputs from an AON camera sensor 316 and the main camera processing subsystem 304 can receive inputs from a main camera sensor 318. The AON camera sensor 316 and the main camera sensor 318 can include any image and/or video sensors or capturing devices. In some cases, the AON camera sensor 316 and the main camera sensor 318 can be part of a multiple-camera assembly, such as a dual-camera assembly. In some examples, the AON camera sensor 316 and the main camera sensor 318 may include an image capture and processing system 100, an image capture device 105A, an image processing device 105B, or a combination thereof. In some implementations, the AON camera processing subsystem 302 of the image processing system 300 can communicate with the AON camera sensor 316 to send and/or receive operational parameters to/from the AON camera sensor 316. Similarly, in some implementations, the main camera processing subsystem 304 of the image processing system 300 can communicate with the main camera sensor 318 to send and/or receive operational parameters to/from the main camera sensor 318. The DRAM subsystem 312 of the image processing system 300 can communicate with DRAM 314 over a data bus 315. For example, the DRAM subsystem 312 can send video frames to and/or retrieve video frames from the DRAM 314. In some implementations, the image processing system 300 can include a local SRAM 320.

In some cases, the AON camera sensor 316 can include optimizations for reducing power consumption. In some cases, the AON camera processing subsystem 302 can be configured to store data (e.g., video frame data) in SRAM 320 located within the image processing system 300. In some cases, storing data in SRAM 320 can conserve power by reducing the power required to drive data and address lines when compared to driving signals over the data bus 315 to communicate with DRAM 314. In some implementations, island voltage rails can be used to power the AON camera sensor 316 and AON camera processing subsystem 302. In some cases, using island rails can conserve power by preventing inactive components of the image processing system 300 from drawing power. In some examples, the AON camera sensor 316 can be clocked with a low power clock source such as one or more ring oscillators. In some implementations, the image and/or video captured by the AON camera sensor 316 can be associated with a different domain from the images and/or video captured by the main camera sensor 318. As described above, a domain can include, without limitation, characteristics or parameters of the frames captured by a camera sensor such as resolution, color depth, and/or framerate. In one illustrative example, the AON camera sensor 316 can capture images with a lower resolution than the main camera sensor 318. In some cases, capturing lower resolution frames with the AON camera sensor 316 can save power by reducing the amount of data (e.g., pixel data) that needs to be read out from the AON camera sensor 316. In some implementations, the AON camera processing subsystem 302 can perform similar processing steps to the main camera processing subsystem 304 on fewer pixels, resulting in fewer calculations and thereby reducing power consumption.

In some cases, a domain can include a set of image processing steps (e.g., noise reduction, edge enhancement, image stabilization, color correction) performed on images or video frames captured by a camera sensor. In some implementations, video frames captured by the AON camera sensor 316 and the main camera sensor 318 can be processed with different image processing steps. For example, the AON camera processing subsystem 302 can perform fewer and/or different processing steps than the main camera processing subsystem 304. In some cases, performing fewer and/or different processing operations with the AON camera processing subsystem 302 during AON operation can conserve power.

In another example, the AON camera sensor 316 can capture monochrome video frames while main camera sensor 318 can capture red, green, blue (RGB) color video frames. In some cases, reading out and processing monochrome video frames can consume less power than reading out and processing RGB color video frames. In some cases, the video frames captured by the AON camera sensor 316 and the main camera sensor 318 can be based on data captured from different portions of the light spectrum such as visible, ultraviolet (UV), near infrared (NIR), short wave infrared (SWIR), other portions of the light spectrum, or any combination thereof.

In the illustration of FIG. 3, the AON camera sensor 316 and the main camera sensor 318 can each provide frames to a different camera processing subsystem. However, in some cases, a single camera processing subsystem can process frames from the AON camera sensor 316 and the main camera sensor 318 without departing from the scope of the present disclosure. Furthermore, although the AON camera sensor 316 and the main camera sensor 318 are shown as two different sensors, one or more camera sensors that can operate in two or more different modes (e.g., an AON mode, a medium power mode, a high power mode, or the like) can also be used without departing from the scope of the present disclosure.

Figure 4A:
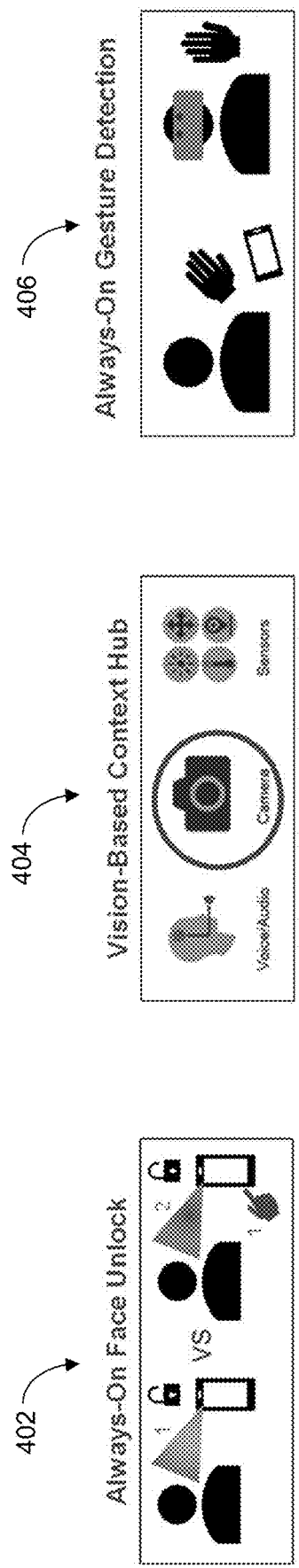
FIG. 4A is a diagram illustrating example always-on (AON) camera uses cases, in accordance with some examples.
Figure 4B:
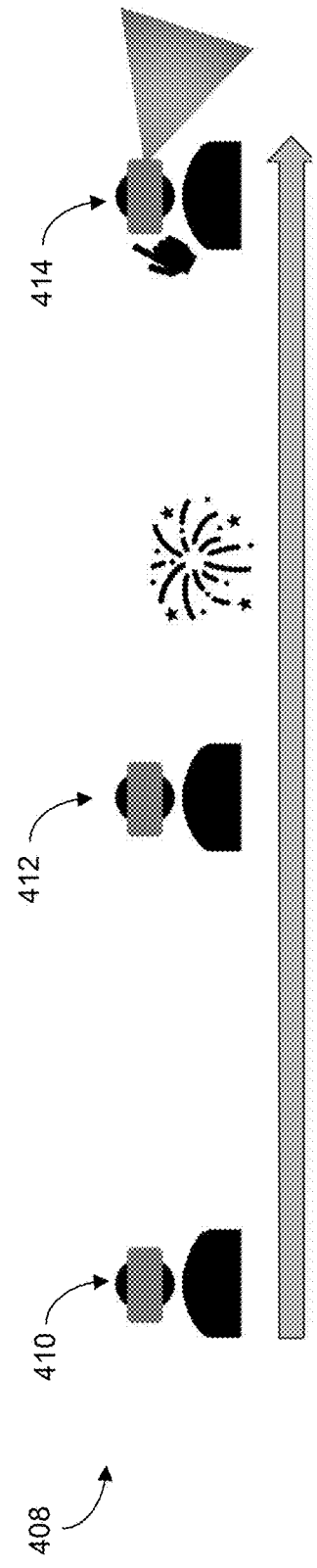
FIG. 4B is a diagram illustrating an example negative shutter lag use case, in accordance with some examples.

FIG. 4A and FIG. 4B illustrate example AON camera system implementations, according to some examples of the present disclosure. In one example illustrated in FIG. 4A, an AON camera sensor (e.g., AON camera sensor 316 shown in FIG. 3 above) can be used to determine whether an authorized user is interacting with a device (e.g., a mobile phone) in an AON face unlock implementation 402. In another example illustrated in FIG. 4A, an AON camera sensor can be used to provide vision-based context sensing implementation 404. In the vision-based context sensing implementation 404 illustrated in FIG. 4A, audio data, AON camera data, and/or data from one or more additional sensors can be used to determine whether a user is participating in a meeting and cause a device to enter into a silent mode. In another illustrative example, a vision-based context sensing implementation can include using a combination of inertial sensor data, audio sensor data, AON camera data, and/or data from one or more additional sensors to determine whether a user is speaking to a device (e.g., to give voice commands) or to another person or device in the room. Another illustrative example of a vision based context sensing implementation can be a combination of inertial sensor data, audio sensor data, AON camera data, and/or data from one or more additional sensors camera to prevent device use by the driver of a car. For example, the driver may be prevented from using a mobile phone while a passenger may be permitted to use a mobile phone. In another example illustrated in FIG. 4A, an AON camera sensor can be used as part of an AON gesture detection implementation 406. For example, an AON camera sensor can be included in an XR system (e.g., an HMD), a mobile device, or any other device in an AON gesture detection implementation 406. In such an implementation, the AON camera can capture images and perform gesture detection to allow a user to interact with a device without making physical contact with the device.

FIG. 4B illustrates an example negative shutter lag video capture sequence 408. In the illustrative example of FIG. 4B, a user wearing an HMD or AR glasses is depicted. In the illustrated example, the user can be observing 410 a scene. In some cases, while the user is observing 410 the scene an event 412 can occur. In some cases, the event 412 can be captured during AON operation (e.g., with AON camera sensor 316 shown in FIG. 3 above) included in the HMD. In the illustrated example, the user can provide a capture input 414 to the HMD to initiate video capture. In some cases, after the user initiates video capture, the HMD can begin capturing video frames in standard operation (e.g., with main camera sensor 318 shown in FIG. 3 above). As will be described in more detail with respect to the figures below, the frames captured during AON operation can be combined with the frames captured during standard operation into a combined video that begins before the capture input. In some cases, the frames captured during AON operation can be transformed to provide a consistent appearance of the combined video frames before and after the capture input. As noted above, references to AON operation herein can be understood to include capturing images and/or frames with one or more AON cameras and/or operating one or more cameras in an AON mode. Similarly, standard operation can be understood to include capturing frames with one or more non-AON cameras and/or one or more cameras operating in a non-AON mode.

Figure 5A:
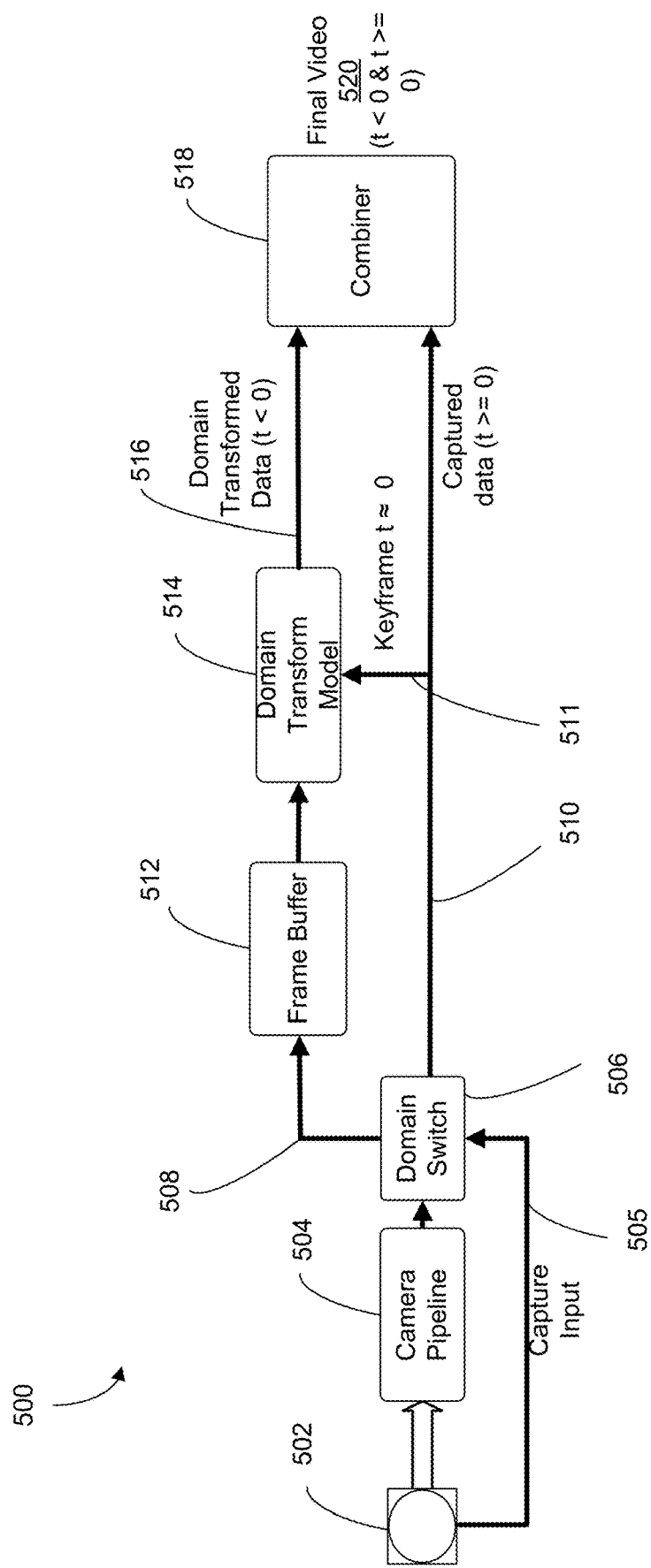
FIG. 5A is a block diagram illustrating an example negative shutter lag system, in accordance with some examples.

FIG. 5A illustrates an example block diagram of a negative shutter lag system 500, according to some examples of the disclosure. As shown, the components of the negative shutter lag system 500 can include one or more camera sensors 502, a camera pipeline 504, a domain switch 506, a frame buffer 512, a domain transform model 514, and a combiner 518. In some cases, the one or more camera sensors 502 can include an AON camera sensor (e.g., AON camera sensor 316 shown in FIG. 3) and a main camera sensor (e.g., main camera sensor 318 shown in FIG. 3). In some examples, the AON camera sensor can capture video frames 508 associated with a first domain and the main camera sensor can capture video frames 510 associated with a second domain. In some cases, the one or more camera sensors 502 can include one or more camera sensors that can operate in two or more modes (e.g., an AON mode, a medium power more, and a high power mode). In some implementations, the one or more camera sensors 502 can capture video frames 508 associated with the first domain during AON operation and captured video frames 510 associated with the second domain during standard operation. In the illustrated example, the time that the negative shutter lag system 500 receives a capture input 505 can be labeled as a time t=0. Video frames captured before the capture input 505 occur during the range of time t<0 and video frames captured after the capture input 505 occur during the range of time t>0.

In some cases, frames captured by the one or more camera sensors 502 can be processed by camera pipeline 504. For example, the camera pipeline 504 can perform noise reduction, edge enhancement, image stabilization, color correction, and/or other image processing operations on the raw video frames provided by the one or more camera sensors 502.

In some examples, the domain switch 506 can be communicatively coupled with the one or more camera sensors 502 and can control which camera sensor(s) and/or camera sensor mode(s) capture video frames. In some cases, the domain switch 506 can receive video frames associated with the first domain before receiving capture input 505. For example, video frames associated with the first domain can be received during AON operation. In some cases, the domain switch 506 can route the video frames 508 associated with the first domain to the frame buffer 512. In some implementations, the domain switch 506 can enable adding additional frames to the frame buffer 512 during AON operation and disable adding additional frames to the frame buffer 512 during standard operation. In some examples, frame buffer 512 can receive video frames 508 associated with the first domain directly from the one or more camera sensors 502 and/or the camera pipeline 504.

In some cases, the negative shutter lag system 500 can receive a capture input 505 (e.g., from a user pressing a button, performing a gesture, or the like). Based on the capture input 505, the negative shutter lag system 500 can begin capturing video frames associated with the second domain. In some cases, the first video frame (or a subsequent video frame) associated with the second domain captured after receiving the capture input 505 can be stored or marked as a keyframe 511. In some cases, the keyframe 511 can be captured at approximately the same time as receiving the capture input 505. After receiving the capture input 505, the one or more camera sensors 502 and camera pipeline 504 can output video frames associated with the second domain until an end capture input is received. In some cases, at the time of receiving the capture input 505, the domain switch 506, one or more camera sensors 502, and/or camera pipeline 504 can stop providing new frames to the frame buffer 512. In such cases, the video frames captured in the frame buffer 512 can span a period of time B based on the buffer length of frame buffer 512. In some cases, video frames stored in frame buffer 512 can span the time period between t=−B and time the last video frame associated with the first domain is captured before capture input 505 t≈0.

In some cases, domain transform model 514 can be implemented as a deep-learning neural network. In some implementations, domain transform model 514 can be trained to transform video frames stored in frame buffer 512 associated with the first domain into transformed video frames associated with the second domain. In some implementations, the domain transform model 514 can be trained to use the keyframe 511 associated with the second domain as a guide for transforming the video frames associated with the first domain stored in the frame buffer 512.

In one illustrative example, a training dataset can include original videos and training videos. In some cases, all of the frames of the original videos can be associated with the second domain. In some cases, a portion of each of the training videos (e.g., the first 30 frames, first 100 frames, first 300 frames, first 900 frames, or any other number of frames) can be associated with the first domain to simulate data stored in the frame buffer 512 during AON operation. In some cases, the portion of the video frames associated with the first domain can be generated from the original videos by transforming a portion of the original video frames from the second domain to the first domain (e.g., by downscaling resolution, converting from color to monochrome, reducing framerate, simulating different steps in the camera pipeline, or the like). The original videos and the training videos can include a keyframe (e.g., keyframe 511) associated with the second domain that can be used by the domain transform model 514 to transform the portion of the training videos associated with the first domain to the second domain.

In some cases, the resulting transformed video frames generated by the domain transform model 514 can be directly compared to the original video frames and a loss function can be used to determine an amount of error between the transformed video frames and the original video frames. The parameters (e.g., weights, biases, etc.) of the deep learning network can be adjusted (or tuned) based on the error. Such a training process can be referred to as supervised learning using backpropagation, which can be performed until the tuned parameters provide a desired result.

In one example, the domain transform model 514 can be trained utilizing a deep generative neural network model (e.g., generative adversarial network (GAN)). A GAN is a form of generative neural network that can learn patterns in input data so that the neural network model can generate new synthetic outputs that reasonably could have been from the original dataset. A GAN can include two neural networks that operate together. One of the neural networks (referred to as a generative neural network or generator denoted as G(z)) generates a synthesized output, and the other neural network (referred to as an discriminative neural network or discriminator denoted as D(X)) evaluates the synthesized output for authenticity (whether the synthesized output is from an original dataset, such as the training dataset, or is generated by the generator). The generator G(z) can correspond to the domain transform model 514. The generator is trained to try and fool the discriminator into determining a synthesized video frame (or group of video frames) generated by the generator is a real video frame (or group of video frames) from a training dataset (e.g., the first group of training video data). The training process continues, and the generator becomes better at generating the synthetic video frames that look like real video frames. The discriminator continues to find flaws in the synthesized video frames, and the generator figures out what the discriminator is looking at to determine the flaws in the images. Once the network is trained, the generator is able to produce realistic looking video frames that the discriminator is unable to distinguish from the real video frames.

One example of a neural network that can be used for training of the domain transform model 514 is a conditional GAN. In a conditional GAN, the generator is learning a conditional distribution. A conditional GAN can condition the generator and discriminator neural networks with some vector y, in which case the vector y is input into both the generator and discriminator networks. Based on the vector y, the generator and discriminator become G(z,y) and D(X,y), respectively. The generator G(z,y) models the distribution of the data, given z and y, in which case the data X is generated as X~G (X|z, y). The discriminator D(X,y) attempts to find a discriminating label for X and $X_G$, which are modeled with d~D(d|X,y). The discriminator D(X, y) and the generator G(z, y) are thus jointly conditioned to two variables z or X and y.

In one illustrative example, a conditional GAN can generate a video frame (or a plurality of video frames) conditioned on a label (e.g., represented as the vector y), where the label indicates the class of an object that is in the video frame (or plurality of video frames), and the goal of the GAN is transform a video frame (or plurality of video frames) associated with the first domain to a video frame (or plurality of video frames) associated with the second domain that includes that class of object. There is a dueling aspect between the generator G and the discriminator D that is maximized with respect to the parameters of the discriminator D. The discriminator D will try to discriminate between real video frames (from the first group of training video data) and fake video frames (generated by the generator G based on the second group of training video data) as well as possible, and the generator G should minimize the ability of the discriminator D to identify fake images. Parameters of the generator G (e.g., weights of the nodes of the neural network and in some cases other parameters, such as biases) can be adjusted during the training process so that the generator G will output video frames that are indistinguishable from real video frames associated with the second domain. A loss function can be used to analyze errors in the generator G and discriminator D. In one illustrative example, a binary cross-entropy loss function can be used. Other loss functions can be used in some cases.

During inference, (after the domain transform model 514 has been trained), parameters of the domain transform model 514 (e.g., generator G trained by the GAN) can be fixed and the domain transform model 514 can transform video frames associated with the first domain (e.g., by upscaling resolution, colorizing, and/or performing any other transformation) using the keyframe 511 as a guide to generate transformed video frames 516 associated with the second domain.

In some cases, combiner 518 can combine the transformed video frames 516 and the captured video frames 510 associated with the second domain for time t>=0 into a combined video 520 having video frames associated with the second domain. In one illustrative example, combiner 518 can perform a concatenation of the transformed video frames 516 and the captured video frames 510 associated with the second domain to generate the combined video 520.

Figure 5B:
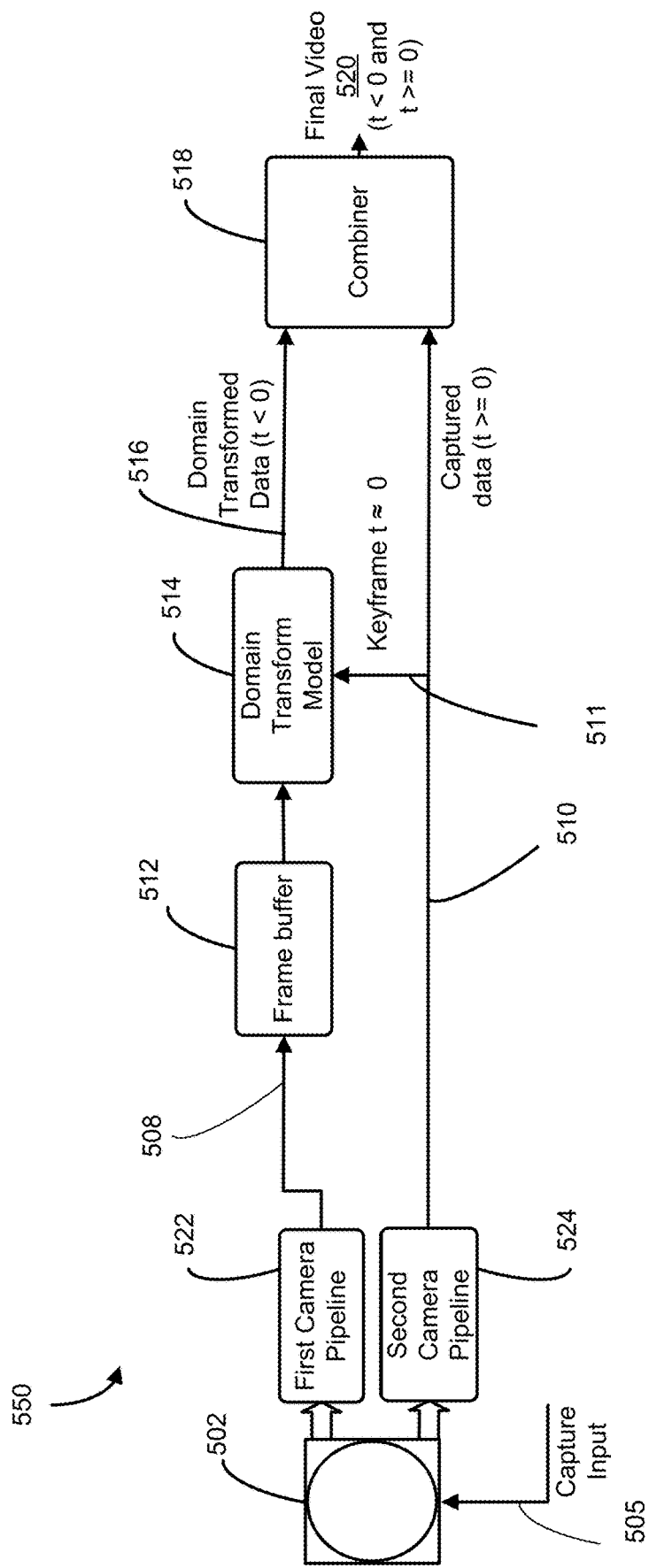
FIG. 5B is a block diagram illustrating another example negative shutter lag system, in accordance with some examples.

FIG. 5B illustrates a block diagram of another example negative shutter lag system 550. Similar to the negative shutter lag system 500 shown in FIG. 5A, the negative shutter lag system 550 can include one or more camera sensors 502, frame buffer 512, domain transform model 514, and combiner 518. In the illustrated example of FIG. 5B, the domain switch 506 shown in FIG. 5A has been removed. In addition, instead of including a single camera pipeline 504 as shown in FIG. 5A, negative shutter lag system 550 can include a first camera pipeline 522 and a second camera pipeline 524 communicatively coupled to the one or more camera sensors 502.

As illustrated, the first camera pipeline 522 can receive video frames from the one or more camera sensors 502. In some cases, the first camera pipeline 522 can receive video frames from the one or more camera sensors 502 during AON operation of the one or more camera sensors 502. The first camera pipeline 522 can perform noise reduction, edge enhancement, image stabilization, color correction, and/or other image processing operations on the video frames from the one or more camera sensors 502 and the output of the first camera pipeline 522 can be routed to the frame buffer 512. The video frames output from the first camera pipeline 522 can be associated with a first domain. In some cases, the first domain can include the specific processing steps performed by the first camera pipeline 522. The output of the first camera pipeline 522 can include video frames 508 associated with the first domain.

The second camera pipeline 524 can also receive video frames from the one or more camera sensors 502. In some cases, the second camera pipeline 524 can receive video frames from the one or more camera sensors 502 during standard operation of the one or more camera sensors 502. The second camera pipeline 524 can perform one or more image processing operations on the received video frames. In some cases, the image processing operations performed by the second camera pipeline 524 can perform different processing steps and/or different numbers of processing steps compared to the first camera pipeline 522. In some cases, the second domain can include the specific processing steps performed by the second camera pipeline 524. The output of the second camera pipeline 524 can include a keyframe 511 associated with the second domain and captured video frames 510 associated with the second domain. In some cases, when a capture input 505 is received (e.g., at time t=0), the one or more camera sensors 502 can pause outputting video frames to the first camera pipeline 522 and begin outputting video frames to the second camera pipeline 524.

As described above with respect to FIG. 5A, the domain transform model 514 can be a deep learning neural network trained to transform video frames from the first domain to the second domain. In the case of the negative shutter lag system 550, generating the portion of each of the training videos associated with the first domain can include emulating the differences in processing steps between the first camera pipeline 522 and the second camera pipeline 524. In some cases, emulating the differences in processing steps between the first camera pipeline 522 and the second camera pipeline 524 can be done in addition to replicating any other differences between the first domain and the second domain (e.g., resolution, color depth, framerate, or the like). Using the training set described above, the domain transform model 514 can be trained in a supervised training process and/or trained with a GAN as described in the examples above, as well as any other suitable training technique.

During inference, (after the domain transform model 514 has been trained), parameters of the domain transform model 514 (e.g., generator G trained by the GAN) can be fixed and the domain transform model 514 can transform video frames associated with the first domain (e.g., by upscaling resolution, colorizing, emulating image processing steps of a camera pipeline and/or performing any other transformation) using the keyframe 511 as a guide to generate transformed video frames 516 associated with the second domain.

Figure 6:
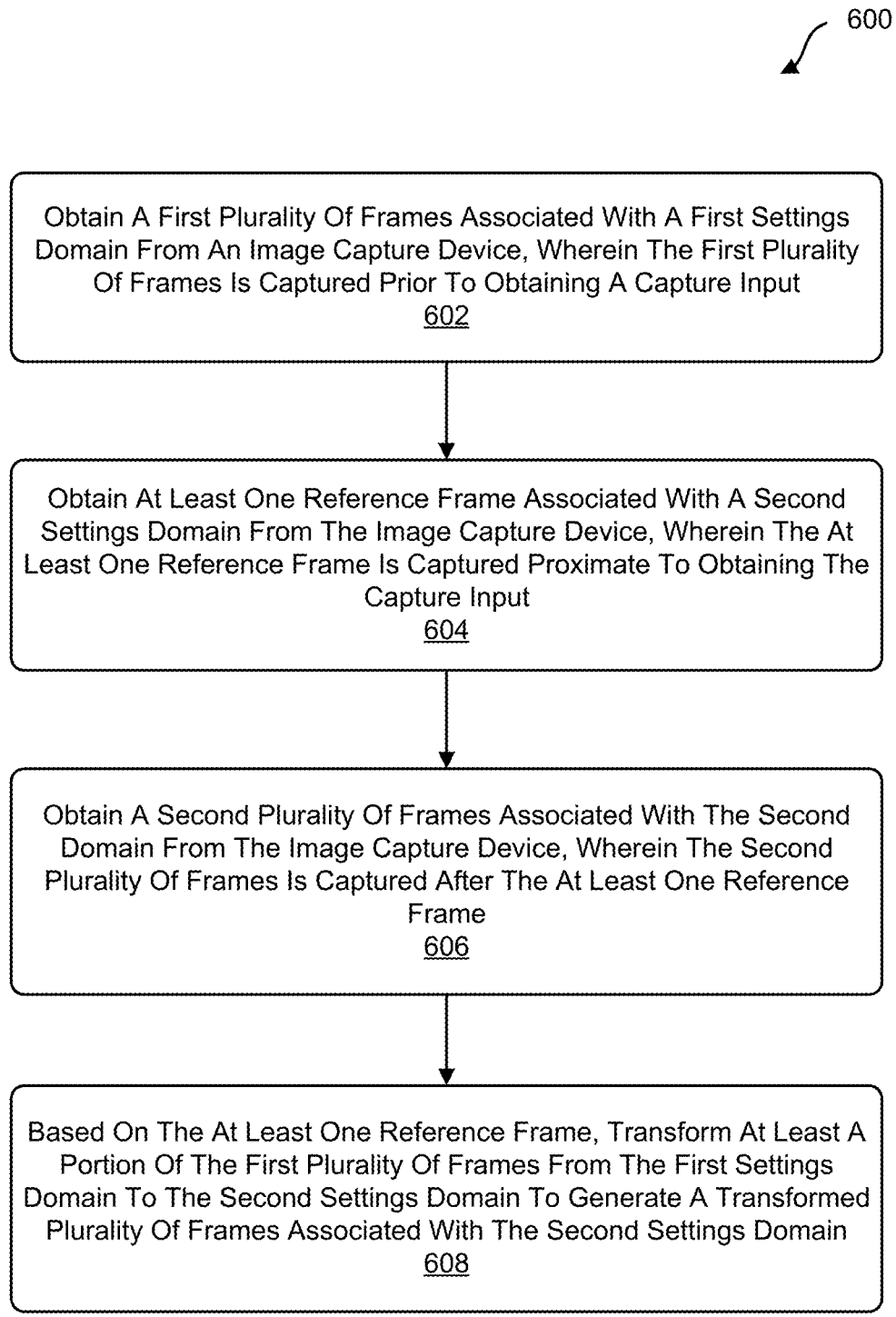
FIG. 6 is a flow diagram illustrating an example of a process for processing one or more frames in accordance with some examples.

FIG. 6 is a flow diagram illustrating an example of a process 600 of processing one or more frames. At block 602, the process 600 includes obtaining a first plurality of frames associated with a first settings domain from an image capture system (e.g., image capture and processing system 100 shown in FIG. 1, image sensor 202 shown in FIG. 2, one or more camera sensors 502) wherein the first plurality of frames is captured prior to obtaining a capture input. In some cases, the first settings domain includes a first resolution. In some cases, the first setting domain includes a first framerate.

At block 604, the process 600 includes obtaining at least one reference frame (e.g., a keyframe) associated with a second settings domain from the image capture system. The at least one reference frame is captured proximate to obtaining the capture input.

At block 606, the process 600 includes obtaining a second plurality of frames associated with the second settings domain from the image capture system. The second plurality of frames is captured after the at least one reference frame. In some cases, the second settings domain includes a second resolution. In some cases, the second settings domain includes a second framerate.

At block 608, the process 600 includes based on the at least one reference frame, transforming (e.g., with domain transform model 514 shown in FIG. 5A and FIG. 5B) at least a portion of the first plurality of frames to generate a transformed plurality of frames associated with the second settings domain. In some cases, transforming at least the portion of the first plurality of frames includes upscaling (e.g., with upscaling model 914 shown in FIG. 9) at least the portion of the first plurality of frames from the first resolution to the second resolution. In some cases, transforming at least the portion of the first plurality of frames includes converting (e.g., with framerate converter 1122 shown in FIG. 11) at least the portion of the first plurality of frames from the first framerate to the second framerate. While the following examples include discussion of the plurality of frames, the examples can be associated with a portion of the plurality of frames (e.g., at least the portion of the first plurality of frames).

In some cases, process 600 includes combining the transformed plurality of frames and the second plurality of frames to generate (e.g., with combiner 1118) a video associated with the second settings domain.

Figure 13:
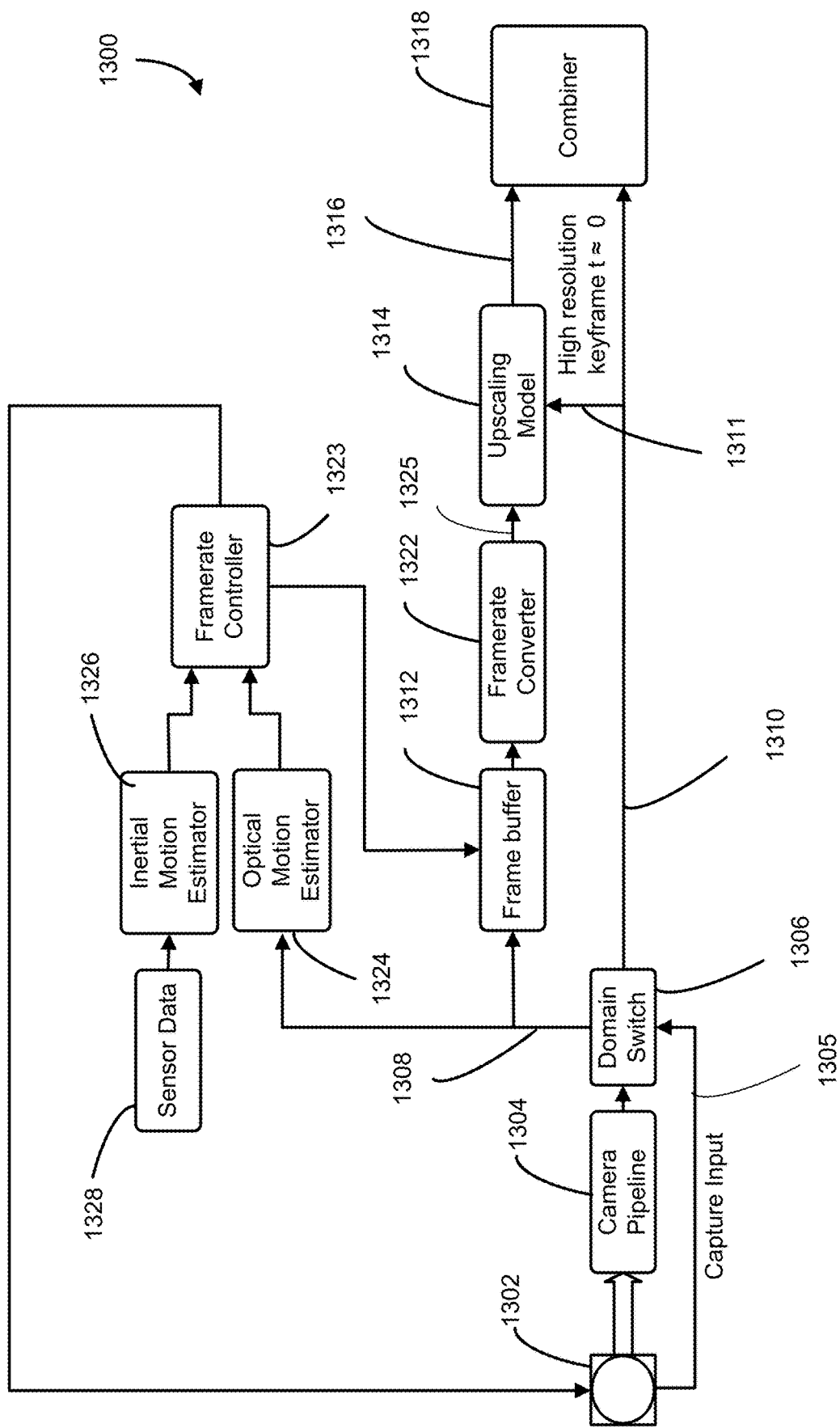
FIG. 13 is a block diagram illustrating another example negative shutter lag system, in accordance with some examples.

In some cases, process 600 includes obtaining motion information (e.g., from inertial motion estimator 1326 and/or optical motion estimator 1324 shown in FIG. 13) associated with the first plurality of frames, wherein generating the transformed plurality of frames associated with the second settings domain is based on the first plurality of frames, the at least one reference frame, and the motion information. In some cases, process 600 includes determining a panning direction based on the motion information associated with the first plurality of frames and applying the panning direction to the transformed plurality of frames.

In some cases, process 600 includes capturing a first subset of the first plurality of frames at a first framerate and capturing a second subset of the first plurality of frames at a second framerate, different from the first framerate. In some implementations, a change between the first framerate and the second framerate is based at least in part on motion information associated with the first subset of the first plurality of frames, the second subset of the first plurality of frames, or both.

In some cases, process 600 includes obtaining an additional reference frame associated with the second settings domain from the image capture system. In some implementations, the additional reference frame is captured prior to obtaining the capture input. In some cases, generating the transformed plurality of frames associated with the second domain is based on the first plurality of frames, the at least one reference frame, and the additional reference frame. In some examples, the at least one reference frame provides a reference for transforming at least a first portion of the first plurality of frames and the additional reference frame provides a reference for upscaling at least a second portion of the first plurality of frames.

While the examples of the present disclosure describe various techniques for negative shutter lag related to video frames, the techniques of the present disclosure can also be utilized to provide similar negative shutter lag for still images (also referred to as frames herein). For example, a user may have missed an interesting event and after the event occurs the user can initiate a capture input e.g., capture input 505 shown in FIG. 5A and FIG. 5B) for a still image capture. In such cases, a negative shutter lag system such as negative shutter lag system 500 shown in FIG. 5A or negative shutter lag system 550 shown in FIG. 5B can receive a selection of one or more selected frames stored in the frame buffer 512 to be transformed from the first domain to the second domain. In some cases, the negative shutter lag system (or, e.g., a system including the negative shutter lag system such as XR system 200) can present an interface for selecting the one or more selected frames. For example, the user can be provided with an interface for stepping through and reviewing the video frames stored in frame buffer 512 frame-by-frame to select one or more selected frames for transformation. Other illustrative examples of an interface for selecting the one or more selected frames can include a slider for advancing through frames stored in the frame buffer 512 and a thumbnail gallery of the frames stored in the frame buffer 512.

In some cases, the negative shutter lag system can suggest one or more frames to transform. In one illustrative example, the negative shutter lag system can determine whether there has been a significant change or motion that exceeds a threshold amount of change or motion in a particular frame compared to other recent frames and suggest the frame (or frames) that exceed the threshold. For example, the negative shutter lag system may determine whether there has been significant change or motion using a change detection algorithm to analyze changes or motion of a plurality of detected and/or tracked features. In another illustrative example, a deep learning neural network can be trained to determine which frames contain relevant and/or interesting content based on training with a dataset of labeled image data. In some cases, the deep learning neural network can be trained on a personalized dataset of images that have been taken by a particular user. In another illustrative example, the negative shutter lag system can determine a change in the number of human faces as a basis for suggesting one or more frames to transform. For example, a face detection neural network can be trained on a dataset of images of faces and non-faces to determine the number of human faces in the frames stored in frame buffer 512. Once the negative shutter lag system receives the selection of the one or more selected frames, domain transform model 514 can transform the one or more selected frames to generate one or more transformed frames associated with the second domain.

Figure 7:
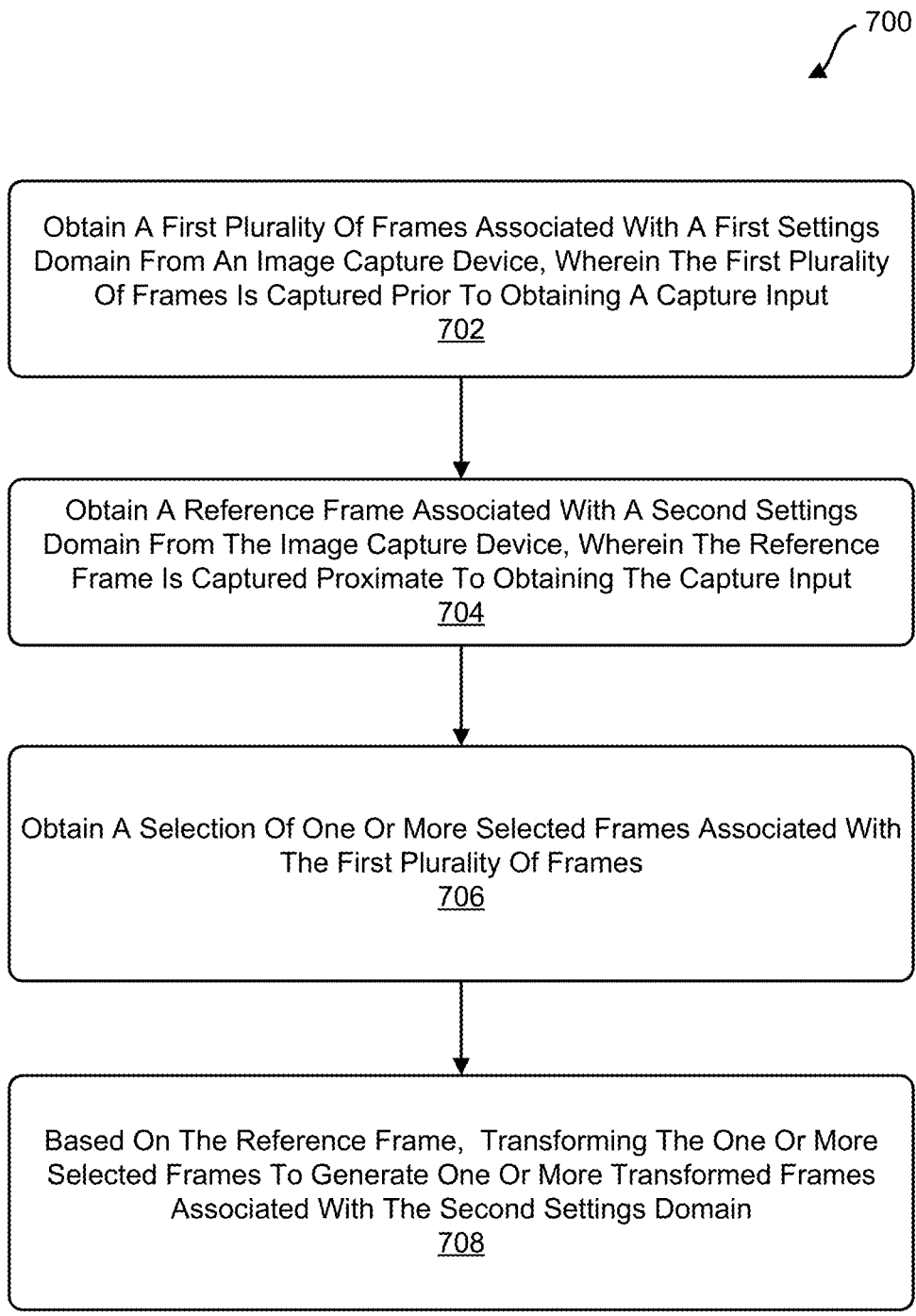
FIG. 7 is a flow diagram illustrating an example of a process for processing one or more frames, in accordance with some examples.

FIG. 7 is a flow diagram illustrating an example of a process 700 of processing one or more frames. At block 702, the process 700 includes obtaining a first plurality of frames associated with a first settings domain from an image capture system (e.g., image capture and processing system 100 shown in FIG. 1, image sensor 202 shown in FIG. 2, and/or one or more camera sensors 502), wherein the first plurality of frames is captured prior to obtaining a capture input.

At block 704, the process 700 includes obtaining a reference frame (e.g., a keyframe) associated with a second settings domain from the image capture system, wherein the reference frame is captured proximate to obtaining the capture input.

At block 706, the process 700 includes obtaining a selection of one or more selected frames associated with the first plurality of frames. For example, the user can be provided with an interface for stepping through and reviewing the video frames stored in frame buffer (e.g., frame buffer 512 shown in FIG. 5A and FIG. 5B) frame-by-frame to select one or more selected frames for transformation.

At block 708, the process 700 includes based on the reference frame, transforming (e.g., with domain transform model 514 shown in FIG. 5A and FIG. 5B) the one or more selected frames to generate one or more transformed frames associated with the second settings domain.

Figure 8A:
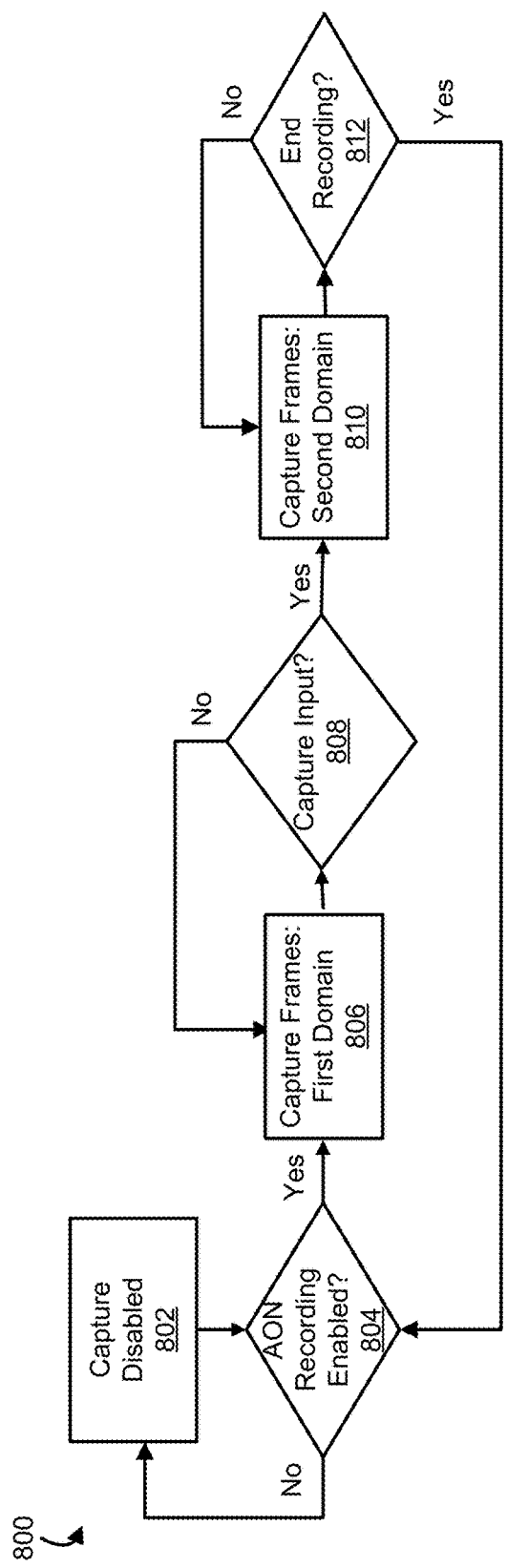
FIG. 8A is a flow diagram illustrating an example of a process for performing a negative shutter lag capture, in accordance with some examples.

FIG. 8A is a flow diagram illustrating an example process 800 for performing a negative shutter lag capture. At block 802, the process 800 can disable capture of video frames by a camera (e.g., AON camera sensor 316 and/or main camera sensor 318 shown in FIG. 3).

At block 804, the process 800 can determine if AON recording is enabled. If the AON recording is disabled, the process 800 can return to block 802. If AON recording is enabled, the process 800 can proceed to block 806.

At block 806, the process 800 can capture frames associated with a first domain during AON operation. In one illustrative example, the first domain can include capturing monochrome frames from an NIR sensor. In some cases, frames associated with the first domain can be stored in a video buffer (e.g., SRAM 320, DRAM 314 shown in FIG. 3, and/or storage device 1930, memory 1915, ROM 1920, RAM 1925 shown in FIG. 19). For example, the video buffer can include a circular buffer that stores video frames for a particular buffer length (e.g., 1 second, 5 seconds, 30 seconds, 1 minute, 5 minutes, or any other amount of time). In some cases, the video buffer can accumulate video frames until the amount of video stored in the video buffer spans the buffer length. Once the video buffer is filled, each new frame captured at block 806 can replace the oldest frame held in the video buffer. As a result, the video buffer can include the most recent video frames captured at block 806 for a time span based on the buffer length.

At block 808, the process 800 can determine whether a capture input has been received. If the process 800 determines that a capture input has not been received, the process 800 can return to block 806 and continue AON operation. If the process 800 determines that the capture input has been received, the process 800 can continue to block 810.

At block 810, the process 800 can capture video frames associated with a second domain during standard operation. In one illustrative example, the second domain can include capturing RGB frames from a visible light sensor. In some cases, at block 810, the contents of the video buffer can remain fixed during standard operation. In some cases, the video frames associated with the second domain captured at block 810 can be stored in a separate memory or separate portion of memory from the video buffer.

At block 812, the process 800 can determine if an end recording input has been received. If the end recording input was received, process 800 can return to block 804. If the end recording input was not received, process 800 can return to block 810 and continue capturing frames during standard operation.

Figure 8B:
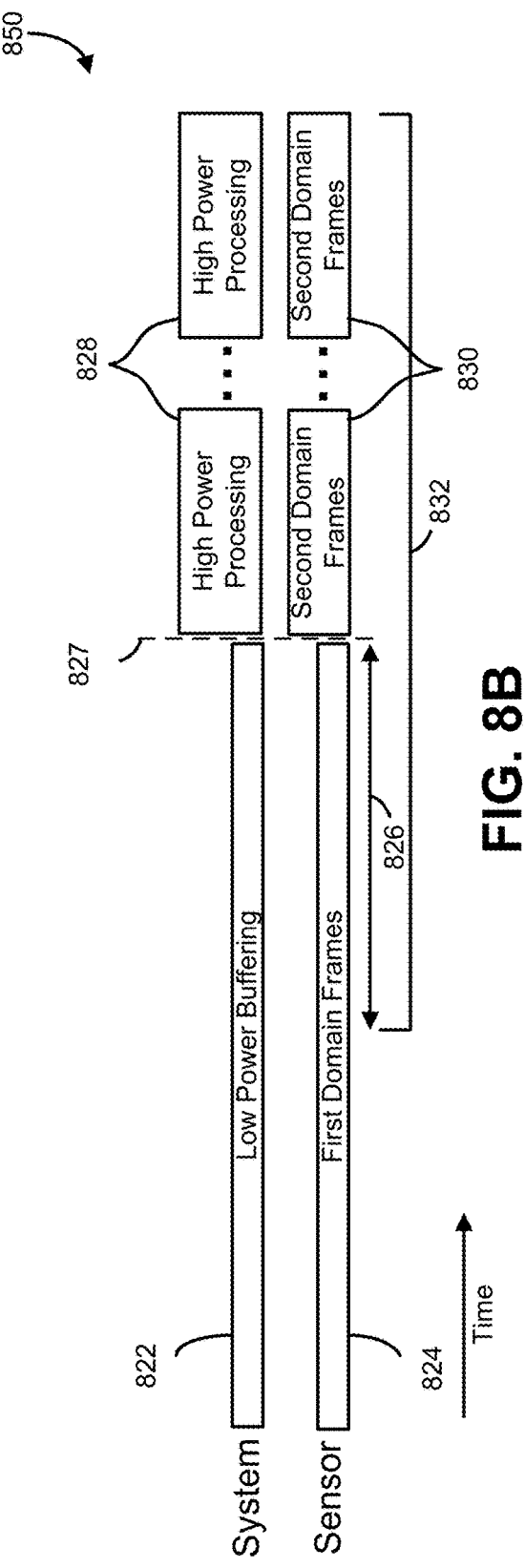
FIG. 8B is a diagram illustrating an example of relative power consumption levels during the negative shutter lag capture process shown in FIG. 8A, in accordance with some examples.

FIG. 8B illustrates a plot 850 of relative power consumption during different stages of the process 800 shown in FIG. 8A. Plot 850 is not shown to scale and is provided for illustrative purposes. In the illustrated example, the height of bar 822 indicates the relative power consumption of an image processing system (e.g., image processing system 300 shown in FIG. 3 above) while capturing video frames associated with a first domain during AON operation (e.g., at block 806). In the illustrated example, the bar 822 can include power consumed by storing video frames captured during AON operation in a video buffer (e.g., a circular buffer). Similarly, in the illustrated example the height of bar 824 can include the power consumed by one or more camera sensors (e.g., AON camera sensor 316 and/or main camera sensor 318 shown in FIG. 3 above) during AON operation. In the illustrated example, the buffer length 826 of the video buffer (e.g., DRAM 314 and/or SRAM 320 shown in FIG. 3) is illustrated by an arrow that ends at the time of the capture input 827 and extends backward in time an amount of time based on the buffer length B of the video buffer.

After the capture input 827 is received, the process 800 can capture video frames associated with a second domain during standard operation (e.g., at block 810). The height of bars 828 can represent the relative power consumed by the image processing system during standard operation and shows an increase in power consumption relative to the power consumed during buffering video frames associated with the first domain. The increased power consumption by the image processing system illustrated by bars 828 can be a result of, for example, processing video frames with larger numbers of pixels, more color information, a higher framerate, more image processing steps, power differences associated with any other differences between the first domain and the second domain, or any combination thereof. Similarly, the bars 830 can represent the power of the one or more camera sensors during standard operation. The increased power consumption by the one or more camera sensors illustrated by bars 830 can result from capturing and transferring data for a larger number of pixels, with more color information, at a higher framerate, power differences associated with any other differences between the first domain and the second domain, or any combination thereof.

In some cases, AON operation can continue for minutes, hours, or days without the process 800 receiving a capture input. In such cases, reducing the power associated with capturing frames during AON operation when compared to standard operation can significantly increase the usable battery life of a negative shutter lag system. In some cases, an AON camera system that always captures and processes high power video frames, both during standard operation and AON operation, can consume available power (e.g., from a battery) much more quickly by comparison.

Video frame capture during standard operation can continue until process 800 receives an end recording input (e.g., at block 812). As described with respect to negative shutter lag system 500 shown in FIG. 5A and negative shutter lag system 550 shown in FIG. 5B, the video frames associated with the first domain captured before the capture input 827 and stored in the video buffer can be transformed based on the keyframe to generate transformed video frames associated with the second domain. In some cases, the transformed video frames associated with the second domain can be combined (e.g., at combiner 518) with the video frames associated with the second domain to form a combined video. Square bracket 832 illustrates the total time duration of an example combined video based on the illustrated example of FIG. 8B.

Figure 9:
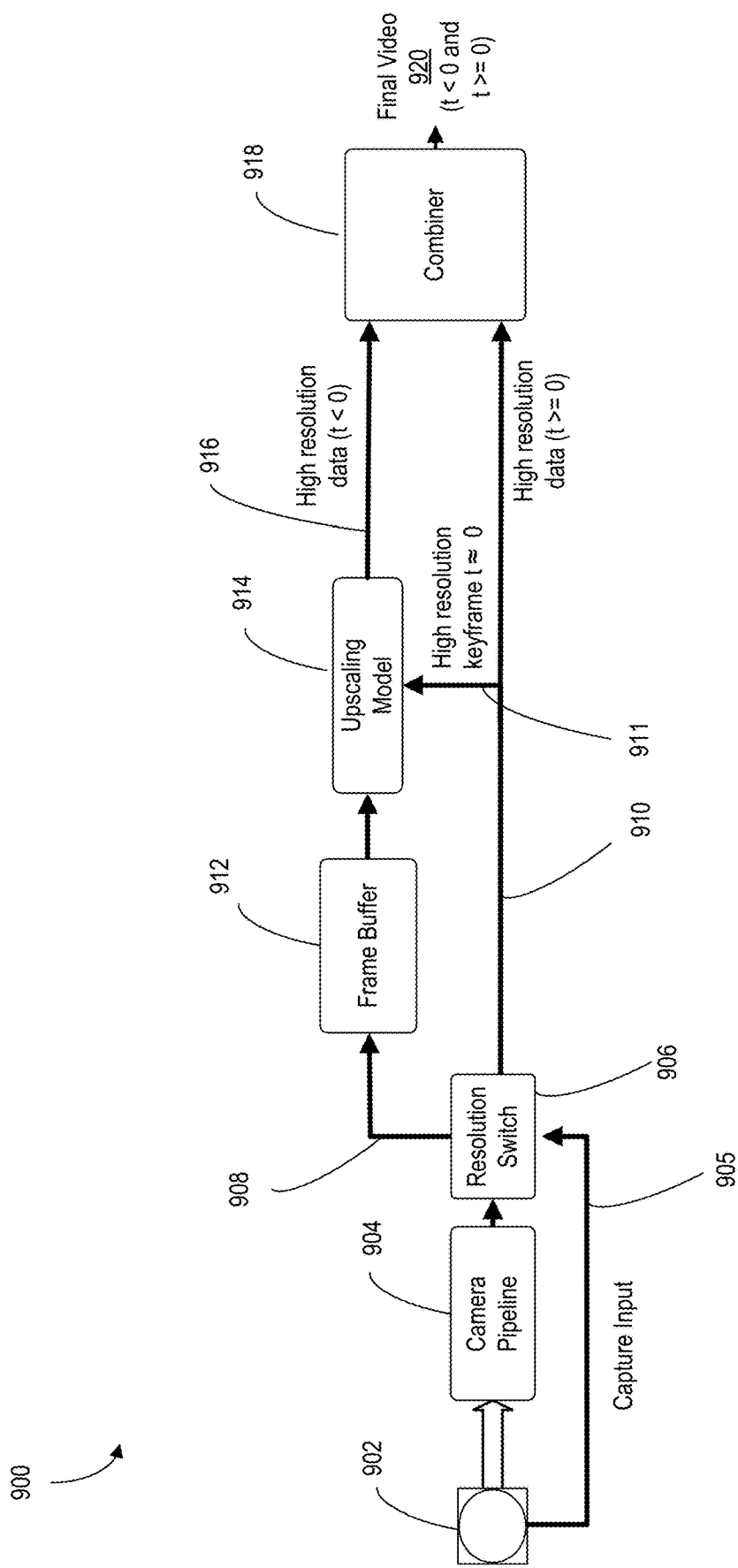
FIG. 9 is a block diagram illustrating another example negative shutter lag system, in accordance with some examples.

FIG. 9 illustrates an example negative shutter lag system 900 according to examples of the present disclosure. As illustrated, the negative shutter lag system 900 can include one or more camera sensors 902, camera pipeline 904, resolution switch 906, frame buffer 912, upscaling model 914, and combiner 918. In the example of FIG. 9, frames 908 captured before the negative shutter lag system 900 receives capture input 905 can have a first resolution and frames 910 captured after the capture input 905 is received can have a second resolution, different from the first resolution. In one illustrative example, the first resolution can be lower than the second resolution. Referring to FIG. 5A and FIG. 5B, low resolution video frames 908 can be an illustrative example of frames associated with a first domain (e.g., video frames 508) and the high resolution video frames 910 can be an illustrative example of video frames associated with a second domain (e.g., captured video frames 510). The resolution switch 906 can be similar to and perform similar functions as the domain switch 506 shown in FIG. 5A. For example, the resolution switch 906 can be communicatively coupled with the one or more camera sensors 902 and can control which camera sensor(s) and/or camera sensor mode(s) are used for capturing video frames during AON operation and standard operation. In some cases, resolution switch 906 can receive video frames at the first resolution from the one or more camera sensors 902 processed by the camera pipeline 904 before capture input 905 is received. For example, low resolution video frames can be received from an AON camera sensor and/or from a camera sensor operating in an AON mode. In some cases, resolution switch 906 can route the low resolution video frames 908 to the frame buffer 912. In some implementations, the resolution switch 906 can enable or disable the frame buffer 912. In some cases, frame buffer 912 can receive low resolution video frames 908 directly from the one or more camera sensors 902 and/or the camera pipeline 904.

In some implementations, the frame buffer 912 can be similar to and perform similar functions as the frame buffer 512 shown in FIG. 5A. For example, the frame buffer 912 can have a buffer length B (e.g., one second, five seconds, ten seconds, thirty seconds, or any other selected buffer length). In some cases, after the capture input 905 is received by the negative shutter lag system 900, the video frames stored in frame buffer 912 can span the time period between $t=-B$ and the time that the last low resolution video frame is captured before capture input 905 (e.g., $t\approx0$)

In some cases, upscaling model 914 can be implemented as a deep-learning neural network. In some cases, upscaling model 914 can be trained to upscale the low resolution video frames 908 stored in frame buffer 912 to the high resolution. In some implementations, the upscaling model 914 can be trained to use the high resolution keyframe 911 as a guide for upscaling the low resolution video frames 908 stored in the frame buffer 912.

In some cases, the upscaling model 914 can be trained using a process similar to the process described for training domain transform model 514 described with respect to FIG. 5A. In the case of negative shutter lag system 900, a training dataset can include original videos and training videos. In some cases, all of the frames of the original videos can be high resolution frames. In some cases, a portion of each of the original videos (e.g., the first 30 frames, first 100 frames, first 300 frames, first 900 frames, or any other number of frames) can be downscaled to the low resolution to simulate data stored in the frame buffer 512 during AON operation to obtain the training videos. The original videos and the training videos can include a keyframe (e.g., keyframe 511) at the high resolution that can be used by the domain transform model 514 to upscale the low resolution portion of the training videos to the high resolution.

During inference, (after the upscaling model 914 has been trained), parameters of the upscaling model 914 (e.g., generator G trained with the GAN) can be fixed and the upscaling model 914 can upscale low resolution frames (e.g., frames stored in frame buffer 912) using the high resolution keyframe 911 as a guide to generate upscaled video frames 916.

In some cases, combiner 918 can combine the upscaled video frames 916 and the high resolution video frames 910 into a high resolution combined video 920. In one illustrative example, combiner 518 can perform a concatenation of the upscaled video frames 916 and the high resolution video frames 910 to generate the combined video 920.

Figure 10:
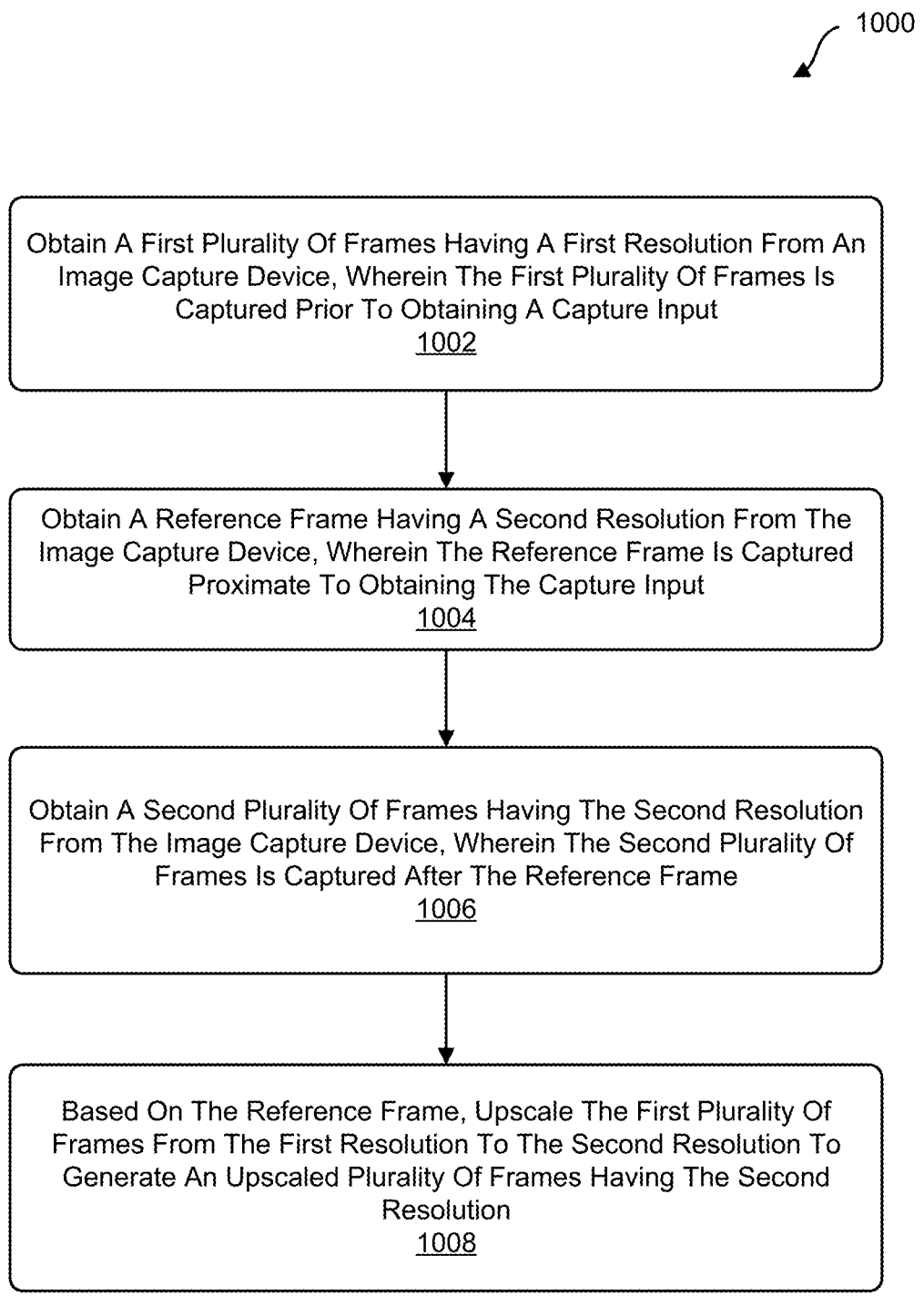
FIG. 10 is a flow diagram illustrating another example of a process for processing one or more frames, in accordance with some examples.

FIG. 10 is a flow diagram illustrating an example of a process 1000 for processing one or more video frames. At block 1002, the process 1000 includes obtaining a first plurality of frames having a first resolution from an image capture system (e.g., image capture and processing system 100 shown in FIG. 1, image sensor 202 shown in FIG. 2, and/or one or more camera sensors 502), wherein the first plurality of frames is captured prior to obtaining a capture input.

At block 1004, the process 1000 includes obtaining a reference frame (e.g., a keyframe) having a second resolution from the image capture system, wherein the reference frame is captured proximate to obtaining the capture input.

At block 1006, the process 1000 includes obtaining a second plurality of frames having the second resolution from the image capture system, wherein the second plurality of frames is captured after the reference frame.

At block 1008, the process 1000 includes based on the reference frame, upscaling (e.g., with domain transform model 514 shown in FIG. 5A and FIG. 5B and/or upscaling model 914 shown in FIG. 9) the first plurality of frames from the first resolution to the second resolution to generate an upscaled plurality of frames having the second resolution.

Figure 11:
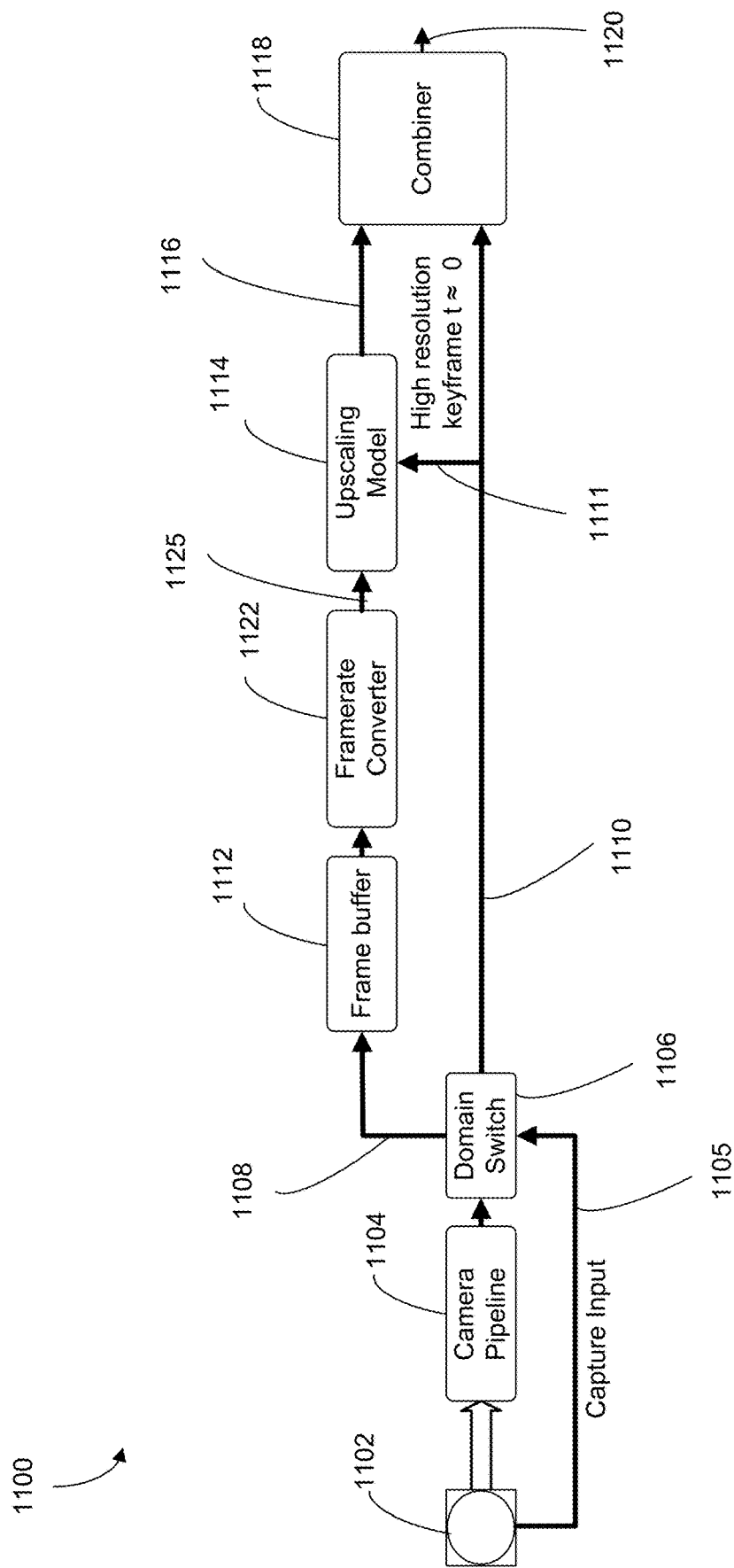
FIG. 11 is a block diagram illustrating another example negative shutter lag system, in accordance with some examples.

FIG. 11 is a diagram illustrating another example negative shutter lag system 1100, in accordance with some examples. As illustrated, the negative shutter lag system 1100 can include one or more camera sensors 1102, camera pipeline 1104, domain switch 1106, frame buffer 1112, framerate converter 1122, upscaling model 1114, and combiner 1118. One or more components of the negative shutter lag system 1100 of FIG. 11 can be similar to and perform similar operations as like numbered components of the negative shutter lag system 900 of FIG. 9. For example, the one or more camera sensors 1102 can be similar to and perform similar operations as the one or more camera sensors 902. As another example, camera pipeline 1104 can be similar to and perform similar operations as camera pipeline 904. In the example of FIG. 11, frames 1108 captured before receiving the capture input 1105 can have a first resolution and a first framerate. Video frames 1110 and keyframe 1111 captured after receiving the capture input 1105 can have a second resolution different from the first resolution and a second framerate different from the second framerate. In one illustrative example, the second resolution can be higher than the first resolution and the second framerate can be higher than the first framerate.

In order to generate upscaled and framerate adjusted video frames 1116 that have the second resolution and the second framerate, the framerate converter 1122 can adjust the framerate of frames 1108 from the first framerate to the second framerate. In one illustrative example, the framerate converter 1122 can interpolate data from adjacent pairs of frames stored in the frame buffer 1112 to generate additional frames and thereby generate framerate adjusted frames 1125. In some cases, the upscaling model 1114, guided by the keyframe 1111, can upscale the resolution of the framerate adjusted frames 1125 to the second resolution. The upscaling model 1114 can be similar to and perform similar operations to the upscaling model 914 of FIG. 9. The upscaling model 1114 can also be trained in a similar fashion to upscaling model 914, as described in more detail with respect to FIG. 9. In some implementations, the resolution upscaling performed by upscaling model 1114 and framerate adjustment performed by framerate converter 1122 can be performed in the reverse order without departing from the scope of the present disclosure. In some cases, the upscaling model 1114, the framerate converter 1122, or a combination thereof can collectively be considered illustrative examples of a domain transform model (e.g., corresponding to domain transform model 514 shown in FIG. 5A and FIG. 5B).

In some cases, combiner 1118 can combine the upscaled and framerate adjusted video frames 1116 and the video frames 1110 with the second resolution and second framerate into a combined video 1120 with the second resolution and second framerate. In one illustrative example, combiner 1118 can perform a concatenation of the upscaled and framerate adjusted video frames 1116 and the video frames 1110 with the second resolution and second framerate to generate the combined video 1120.

Figure 12:
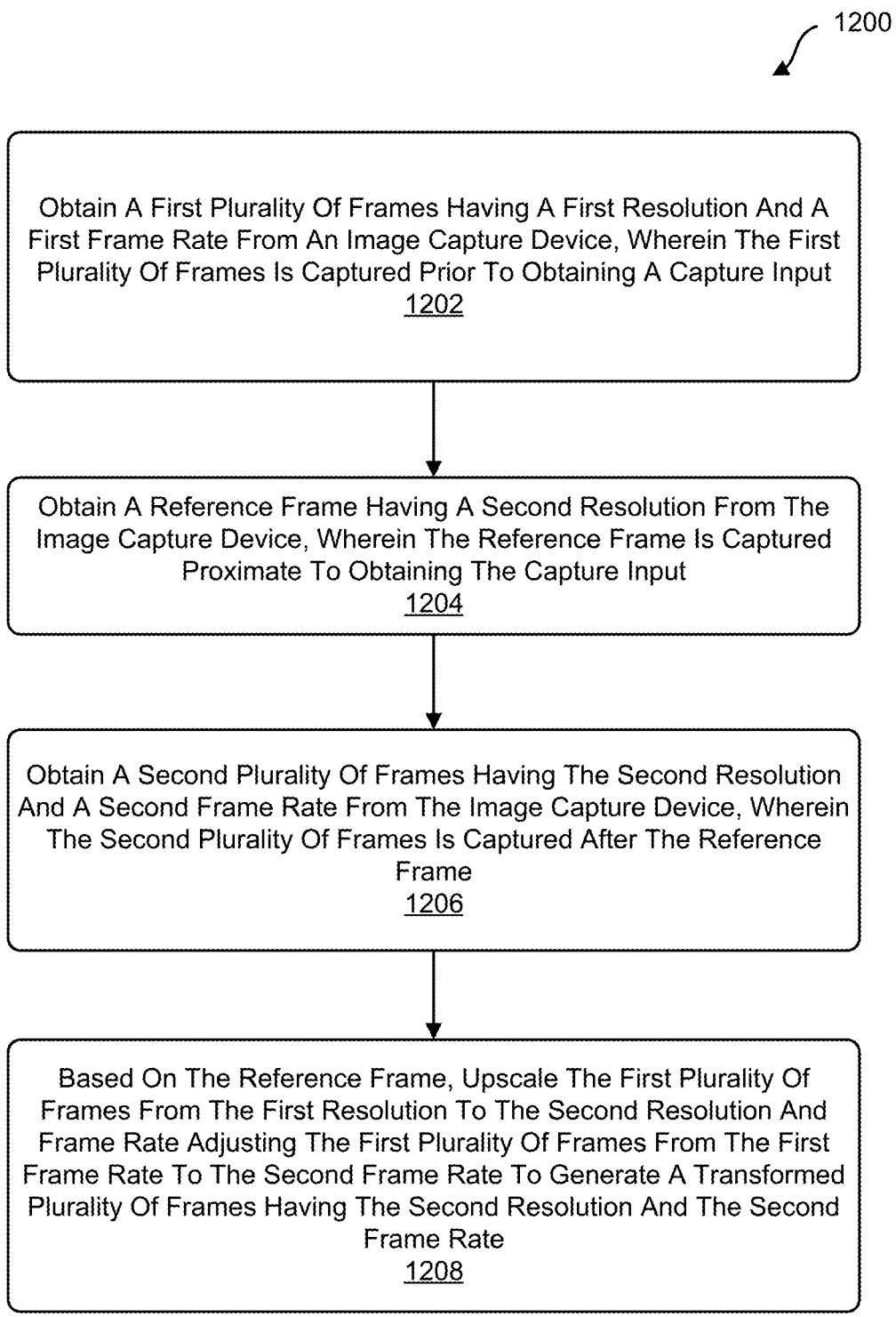
FIG. 12 is a flow diagram illustrating an example of a process for processing one or more frames, in accordance with some examples.

FIG. 12 is a flow diagram illustrating an example of a process 1200 of processing one or more frames. At block 1202, the process 1200 includes obtaining a first plurality of frames having a first resolution and a first framerate from an image capture system (e.g., image capture and processing system 100 shown in FIG. 1, image sensor 202 shown in FIG. 2, and/or one or more camera sensors 502), wherein the first plurality of frames is captured prior to obtaining a capture input.

At block 1204, the process 1200 includes obtaining a reference frame (e.g., a keyframe) having a second resolution from the image capture system, wherein the reference frame is captured proximate to obtaining the capture input.

At block 1206, the process 1200 includes obtaining a second plurality of frames having the second resolution and a second framerate from the image capture system, wherein the second plurality of frames is captured after the reference frame.

At block 1208, the process 1200 includes, based on the reference frame, upscaling the first plurality of frames from the first resolution to the second resolution and framerate adjusting the first plurality of frames from the first framerate to the second framerate to generate a transformed plurality of frames having the second resolution and the second framerate.

FIG. 13 is a diagram illustrating another example negative shutter lag system 1300, according to examples of the disclosure. As illustrated, the negative shutter lag system 1300 can include one or more camera sensors 1302, camera pipeline 1304, domain switch 1306, frame buffer 1312, upscaling model 1314, combiner 1318, and framerate converter 1322. One or more components of the negative shutter lag system 1300 of FIG. 13 can be similar to and perform similar operations as like components of the negative shutter lag system 1100 of FIG. 11. For example, the one or more camera sensors 1302 can be similar to and perform similar operations as the one or more camera sensors 1102. As another example, camera pipeline 1304 can be similar to and perform similar operations as camera pipeline 1104.

As illustrated, negative shutter lag system 1300 can also include framerate controller 1323, optical motion estimator 1324, and inertial motion estimator 1326. In the negative shutter lag system 1300, frames 1308 captured before receiving the capture input 1305 can be captured with a variable framerate. In some cases, the variable framerate of the frames 1308 can be determined by the framerate controller 1323. Framerate controller 1323 can receive inputs from one or more motion estimators. In the illustrative example shown in FIG. 13, framerate controller 1323 can receive inputs from an inertial motion estimator 1326 and an optical motion estimator 1324. In some cases, framerate controller 1323 can receive inputs from fewer (e.g., one), more (e.g., three or more) and/or different types of motion estimators without departing from the scope of the present disclosure. In some cases, sensor data 1328 can be provided as an input to the inertial motion estimator 1326 from one or more sensors (e.g., accelerometer 204 and/or gyroscope 206 shown in FIG. 2, an IMU, and/or any other motion sensor). In some cases, the inertial motion estimator 1326 can determine an estimated amount of motion of the one or more camera sensors 1302 based on sensor data 1328. In some cases, optical motion estimator 1324 can determine an amount of motion of the one or more camera sensors 1302 and/or the scene being captured by the one or more camera sensors 1302 based on the frames 1308 captured before receiving the capture input 1305. In some cases, optical motion estimator can utilize one or more optical motion estimation techniques to estimate an amount of motion of the one or more camera sensors 1302 and/or the scene. In one illustrative example, optical motion estimator 1324 can detect features in two or more of the frames 1308 (e.g., as part of 6DoF SLAM as described with respect to FIG. 2). and determine an amount of motion of one or more features between the two or more of the frames 1308.

In some cases, based on the motion estimates received from the inertial motion estimator 1326 and/or the optical motion estimator 1324, framerate controller 1323 can vary the framerate of the frames 1308 captured by the one or more camera sensors 1302 prior to receiving the capture input 1305. For example, if the framerate controller 1323 detects a relatively small amount of motion (or no motion) of the one or more camera sensors 1302 and/or objects in the scene, the framerate controller 1323 can lower the framerate for frames 1308. In one illustrative example, if the one or more camera sensors 1302 is stationary and capturing a static scene, the framerate controller 1323 can lower the framerate. In some cases, the framerate controller 1323 can lower the framerate of frames 1308 to one eighth, one quarter, one half, or any other fraction of the second framerate. In some cases, by lowering the framerate for frames 1308 before receiving the capture input 1305 (e.g., frames captured during an AON mode), the power consumption can be reduced.

On the other hand, if the framerate controller 1323 detects a large amount of motion from the inertial motion estimator 1326 and/or the optical motion estimator 1324, the framerate controller 1323 can increase the framerate. In one illustrative example, the framerate controller 1323 can increase the framerate if the one or more camera sensors 1302 are in motion and observing a sporting event (e.g., a scene containing a large amount of motion).

In some cases, the framerate controller 1323 can increase the framerate of the frames 1308 captured before receiving the capture input 1305 as high as the framerate used for capturing the frames 1310 after receiving the capture input 1305. In some cases, the framerate controller 1323 can output the variable framerate associated with each of the frames 1308 captured before receiving the capture input 1305 to the frame buffer 1312.

In some cases, by increasing the framerate, the power consumption for capturing the frames 1308 before receiving the capture input 1305 can be increased. Although the power consumption can increase, by increasing the framerate for frames 1308 during periods of increased motion, the quality of frames obtained during AON operation after framerate conversion and upscaling of the frames captured during AON operation can be improved.

In some cases, the framerate converter 1322 can utilize the framerate information stored in the frame buffer 1312 to correctly perform framerate conversion. For example, if the framerate controller 1323 decreased the framerate of the frames 1308, the framerate converter 1322 can generate additional frames (e.g., using an interpolation technique) to match the framerate of the frames 1310 captured after receiving the capture input 1305.

In some cases, the framerate converter 1322 can adjust the framerate of frames 1308 from the variable framerate to the second framerate. In one illustrative example, the framerate converter 1322 can interpolate data from adjacent pairs of frames stored in the frame buffer 1112 to generate additional frames and thereby generate framerate adjusted frames 1325.

In on illustrative example, the frames 1308 captured before receiving the capture input 1305 can have a variable framerate and a first resolution. In addition, the frames 1310 and the keyframe 1311 captured after receiving the capture input 1305 can have a second resolution and a second framerate. In such an example, the upscaling model 1314, guided by the keyframe 1311, can upscale the resolution of the framerate adjusted frames 1325 to the second resolution to generate framerate converted and upscaled frames 1316. The upscaling model 1314 can be similar to and perform similar operations to the upscaling model 914 of FIG. 9. The upscaling model 1314 can also be trained in a similar fashion to upscaling model 914, as described in more detail with respect to FIG. 9. In some implementations, the resolution upscaling performed by upscaling model 1314 and framerate adjustment performed by framerate converter 1322 can be performed in the reverse order without departing from the scope of the present disclosure. In some cases, the upscaling model 1314, the framerate converter 1322, or a combination thereof can be considered illustrative examples of a domain transform model (e.g., corresponding to domain transform model 514 shown in FIG. 5A and FIG. 5B).

In some cases, inertial motion estimation data (e.g., from the inertial motion estimator 1326) can be provided to the upscaling model 1314. In some cases, the inertial motion estimation data can be stored in an inertial motion circular buffer (not shown). In some cases, the inertial estimation data can be associated with each video frame stored in the frame buffer 1312. In some cases, the upscaling model can be trained to utilize the inertial motion estimation data as well as the keyframe 1311 as a guide for upscaling the framerate adjusted frames 1325 to the second resolution. For example, if the inertial motion estimation data indicates that the one or more camera sensors 1302 were moving to the left immediately preceding receiving the capture input 1305, the upscaling model 1314 can include a panning motion to the left in the converted and upscaled frames 1316. In some cases, the upscaling model 1314 can be trained with training data that includes simulated inertial motion estimation data in a process similar to the training process described for training upscaling model 914 with respect to FIG. 9. It should be understood that the use of inertial motion estimation data as a guide can be utilized with any of the examples described herein. For example, inertial motion data can be used as a guide by domain transform model 514 shown in FIG. 5A and FIG. 5B.

Figure 14:
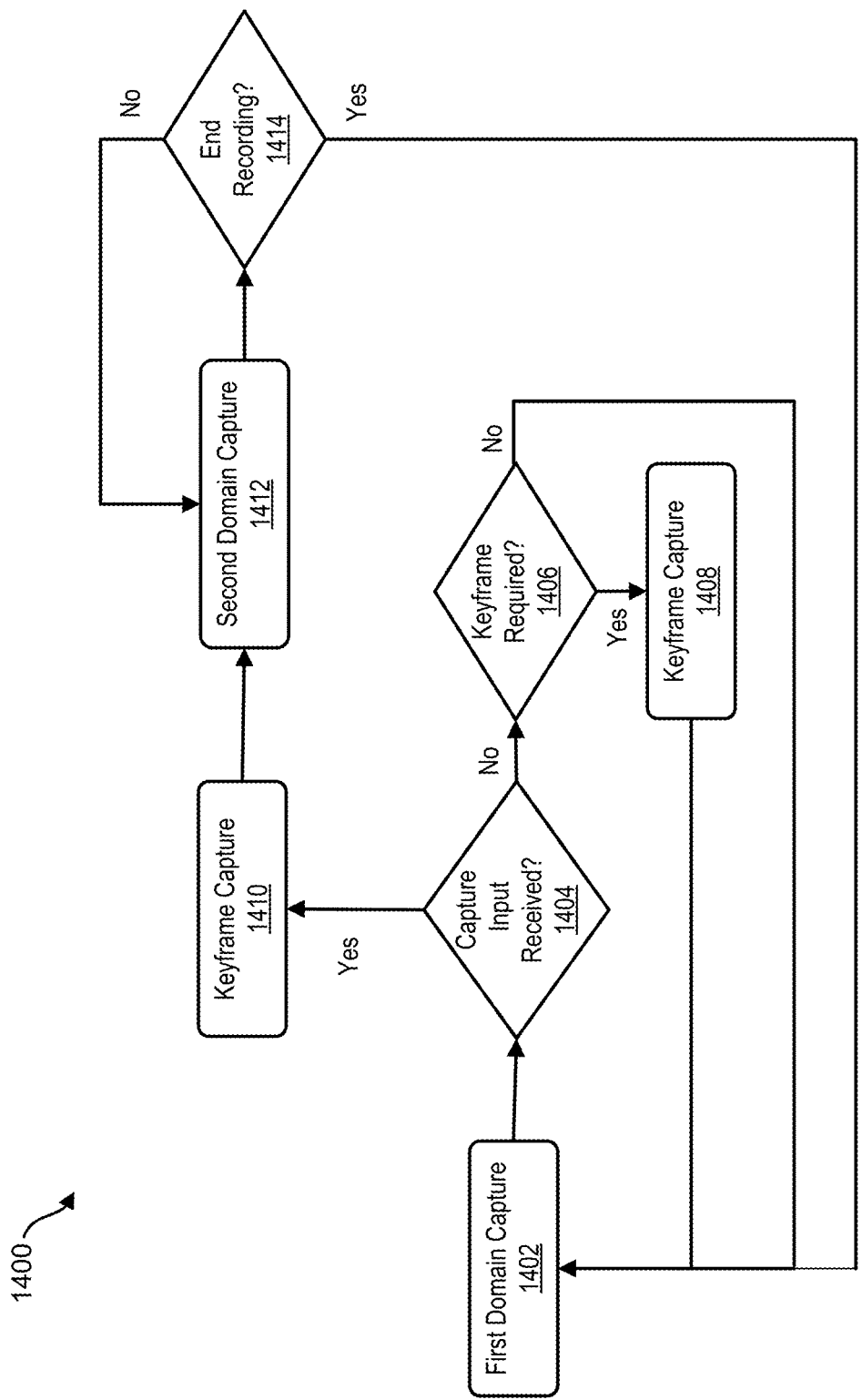
FIG. 14 is a flow diagram illustrating is another flow diagram illustrating an example of a negative shutter lag frame capture sequence, in accordance with some examples.

FIG. 14 is a flow diagram illustrating an example of a process 1400 of processing one or more frames. At block 1402, the process 1400 includes capturing video frames associated with a first domain during AON operation. In some cases, the video frames captured during AON operation can correspond to video frames 508 in FIG. 5A.

At block 1404, the process 1400 can determine if a capture input (e.g., a user pressing a record button, performing a gesture, or the like) was received. If a capture input was not received, the process 1400 can proceed to block 1406. At block 1406, the process 1400 can determine whether capturing a keyframe associated with a second domain, different from the first domain, is required. For example, the process 1400 may determine an amount of time since the most recent keyframe was acquired. In some cases, the period between successively captured keyframes can have a fixed value. In some cases, the period between successively captured keyframes can be variable. In one illustrative example, the period between successively captured keyframes can be determined based on motion estimation from one or more motion estimators (e.g., inertial motion estimator 1326, optical motion estimator 1324, any other motion estimator, or a combination thereof).

If the capture input has been received at block 1404, the process 1400 can proceed to block 1410. At block 1410, the process 1400 can capture a keyframe (e.g., keyframe 511 shown in FIG. 5A) associated with the second domain at approximately the time of the capture input (e.g., capture input 505 shown in FIG. 5A).

At block 1412, the process 1400 can capture video frames associated with the second domain (e.g., captured video frames 510 associated with the second domain shown in FIG. 5A) during standard operation.

At block 1414, the process 1400 can determine if an end recording input was received. If the end recording input was not received, the process 1400 can continue capturing video frames associated with the second domain during standard operation at block 1412. If the end recording input was received, the process 1400 can return to block 1402 if AON operation is enabled.

In some cases, after receiving the end recording input at block 1414, the process 1400 can include transforming the video frames associated with the first domain captured at block 1402 to the second domain with a domain transform model (e.g., domain transform model 514 shown in FIG. 5A). In some cases, each of the keyframes captured at block 1408 can be used as a guide for transforming a portion of the video frames associated with the first domain. In some cases, each of the keyframes captured at block 1408 can be used as a guide for transforming frames from the first plurality of frames that are temporally local to each of the keyframes captured at block 1408. In one implementation, a particular keyframe captured at block 1408 can be used as a guide to transform a subset of the video frames associated with the first domain captured at block 1402 that were captured before the particular keyframe and were also captured after the keyframe immediately preceding the particular keyframe. In one illustrative example, the particular keyframe used to transform each video frame associated with the first domain captured at block 1402 can be the keyframe captured closest in time to each respective video frame. In another illustrative example, selecting which of the keyframes to use as a guide for a particular subset of the video frames associated with the first domain captured at block 1402 can be based at least in part on performing feature detection in the keyframe and one or more of the video frames associated with the first domain and comparing the detected features to determine the best keyframe (or keyframes) to utilize as a guide. For example, a feature matching technique can be used to determine which keyframe chosen from between the two keyframes nearest in time to each respective video frame being transformed at block 1414 is closest in content. In such an example, the keyframe closest in content to the respective video frame can be used as the guide.

Figure 15:
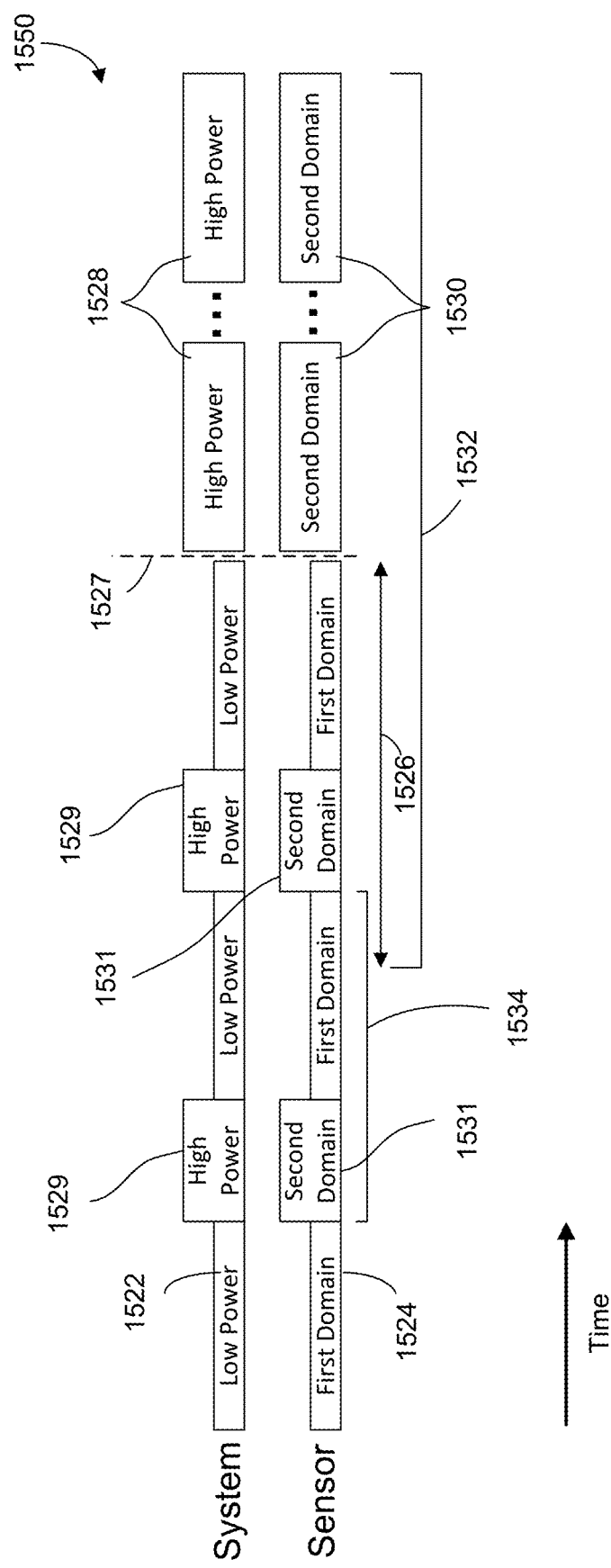
FIG. 15 is a diagram illustrating an example of relative power consumption levels during a negative shutter lag frame capture sequence, in accordance with some examples.

FIG. 15 illustrates a plot 1550 of relative power consumption during different stages of process 1400 shown in FIG. 14. Plot 1550 is not shown to scale and is provided for illustration purposes. In the illustrated example, the height of bar 1522 indicates the relative power consumption of an image processing system (e.g., image processing system 300 shown in FIG. 3 above) while the process 1400 captures video frames associated with the first domain during AON operation (e.g., at block 1402). In the illustrated example, the bar 1522 can include power consumption of storing video frames associated with the first domain in a video buffer (e.g., a circular buffer). Similarly, in the illustrated example the height of bar 1524 can indicate the power consumed by the one or more camera sensors while capturing frames associated with the first domain (e.g., AON camera sensor 316 and/or main camera sensor 318 shown in FIG. 3 above). In the illustrated example of FIG. 15, after receiving the capture input 1527 (e.g., at block 1408), the process 1400 can capture video frames associated with the second domain (e.g., at block 1410). In the illustrated example, the buffer length 1526 of the video buffer (e.g., DRAM 314, SRAM 320 shown in FIG. 3) is illustrated by an arrow that ends at the time of the capture input 1527 and extends backward in time an amount of time based on the buffer length B of the video buffer.

After receiving the capture input 1527, the process 1400 can capture video frames associated with the second domain (e.g., at block 1410). The bars 1528 can represent the power consumed by the image processing system during capture of the video frames associated with the second domain and shows an increase in power consumption relative to the power consumed during buffering video frames associated with the first domain. The increased power consumption by the image processing system can be a result of, for example, processing video frames with larger numbers of pixels, more color information, a higher framerate, more and/or different image processing steps, power differences associated with any other differences between the first domain and the second domain, or any combination thereof. The bars 1529 can represent the power consumed by the image processing system during capture of keyframes associated with the second domain prior to receiving the capture input 1527 (e.g., at block 1406). As illustrated, capturing keyframes associated with the second domain can consume comparable amounts of power to capturing video frames associated with the second domain after receiving the capture input 1527.

The bars 1530 can represent the power of the one or more camera sensors while capturing video frames associated with the second domain. The increased power consumption by the one or more camera sensors can result from capturing and transferring data for a larger number of pixels, with more color information, at a higher framerate, power differences associated with any other differences between the first domain and the second domain, or any combination thereof. The bars 1531 can represent power consumption by the one or more camera sensors during capture of keyframes associated with the second domain prior to receiving the capture input 1527 (e.g., at block 1406).

Prior to receiving the capture input 1527, the period 1534 between successive keyframes can be determined at least in part on estimated motion of the one or more camera sensors and/or the scene captured by the one or more camera sensors.

Capture of video frames associated with the second domain can continue until process 1400 receives an end recording input (e.g., at block 1412). In some cases, the portion of the video frames associated with the first domain captured before the capture input 1527 stored in the video buffer can be transformed from the first domain to the second domain by a domain transform model (e.g., domain transform model 514 shown in FIG. 5A and FIG. 5B) to generate transformed video frames associated with the second domain. The transformed video frames can be combined (e.g., by combiner 518 shown in FIG. 5A and FIG. 5B) with the video frames associated with the second domain captured after the capture input 1527 to form a combined video. Square bracket 1532 illustrates the total time duration of an example combined video based on the illustrated example of FIG. 15.

Figure 16:
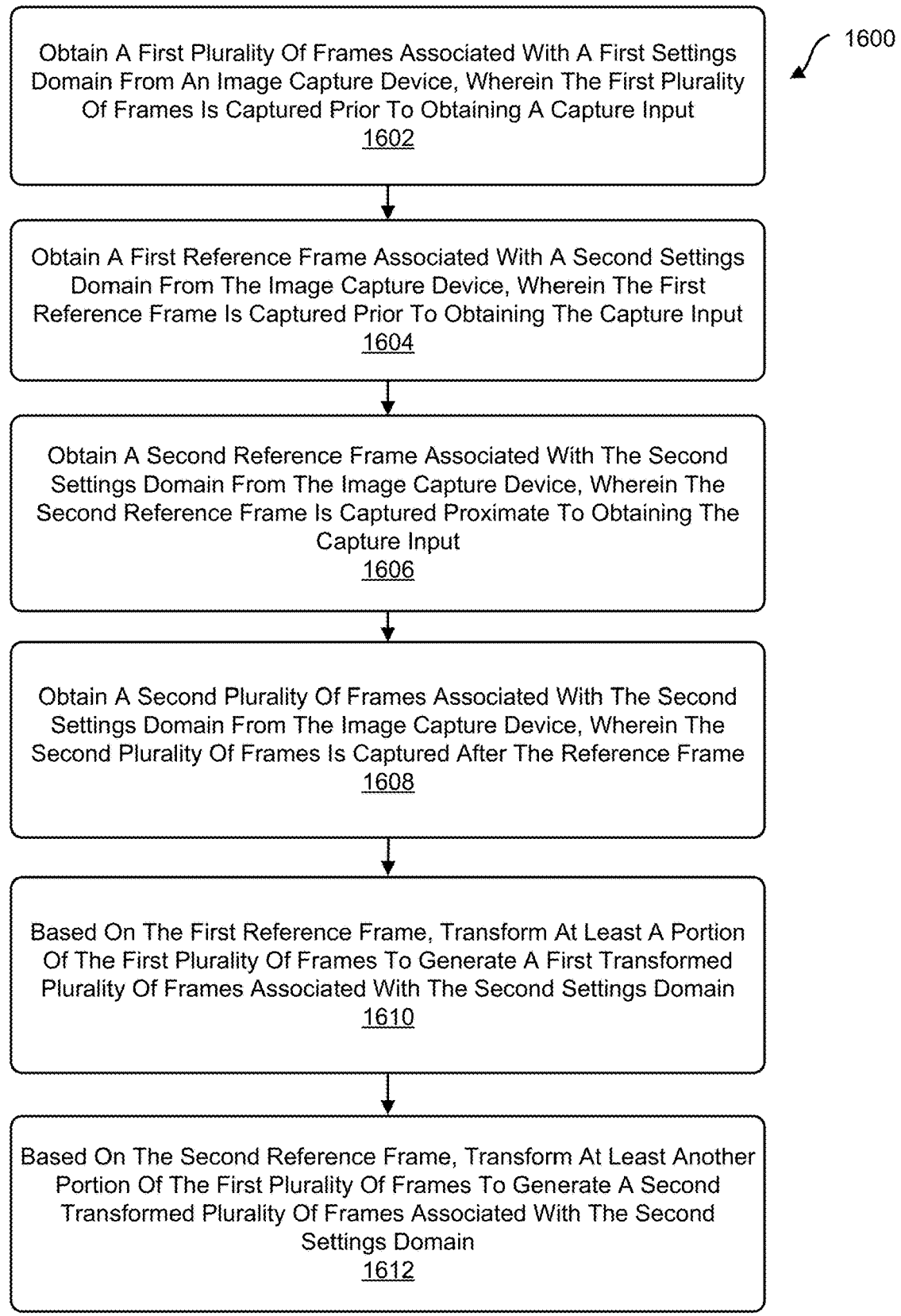
FIG. 16 is a flow diagram illustrating an example of a process for processing one or more frames, in accordance with some examples.

FIG. 16 is a flow diagram illustrating an example of a process 1600 of processing one or more frames. At block 1602, the process 1600 includes obtaining a first plurality of frames associated with a first settings domain from an image capture system (e.g., image capture and processing system 100 shown in FIG. 1, image sensor 202 shown in FIG. 2, and/or one or more camera sensors 502), wherein the first plurality of frames is captured prior to obtaining a capture input.

At block 1604, the process 1600 includes obtaining a first reference frame (e.g., a keyframe) associated with a second settings domain from the image capture system, wherein the first reference frame is captured prior to obtaining the capture input.

At block 1606, the process 1600 includes obtaining a second reference frame associated with the second settings domain from the image capture system, wherein the second reference frame is captured proximate to obtaining the capture input.

At block 1608, the process 1600 includes obtaining a second plurality of frames associated with the second settings domain from the image capture system, wherein the second plurality of frames is captured after the second reference frame.

At block 1610, the process 1600 includes, based on the first reference frame, transforming at least a portion of the first plurality of frames to generate a first transformed plurality of frames associated with the second settings domain.

At block 1612, the process 1600 includes, based on the second reference frame, transforming at least another portion of the first plurality of frames to generate a second transformed plurality of frames associated with the second settings domain.

In some cases, process 1600 includes obtaining a motion estimate associated with the first plurality of frames and obtaining a third reference frame associated with the second settings domain from the image capture system, wherein the third reference frame is captured prior to obtaining the capture input. In some cases, an amount of time between the first reference frame and the third reference frame is based on the motion estimate associated with the first plurality of frames.

In some examples, the processes described herein (e.g., processes 600, 700, 800, 1000, 1200, 1400, 1600 and/or other process described herein) may be performed by a computing device or apparatus. In one example, one or more of the processes can be performed by the image processing system 300 of FIG. 3. In another example, one or more of the processes can be performed by the computing system 1900 shown in FIG. 19. For instance, a computing device with the computing system 1900 shown in FIG. 19 can include the components of the negative shutter lag system 500, negative shutter lag system 550, negative shutter lag system 900, negative shutter lag system 1100, negative shutter lag system 1300, or any combination thereof and can implement the operations of the process 600 of FIG. 6, process 700 of FIG. 7, process 800 of FIG. 8A, process 1000 of FIG. 10, process 1200 of FIG. 12, process 1400 of FIG. 14, process 1600 of FIG. 16 and/or other processes described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the processes 600, 700, 800, 1000, 1200, 1400, 1600 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 600, 700, 800, 1000, 1200, 1400, and 1600 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 600, 700, 800, 1000, 1200, 1400, 1600 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 17:
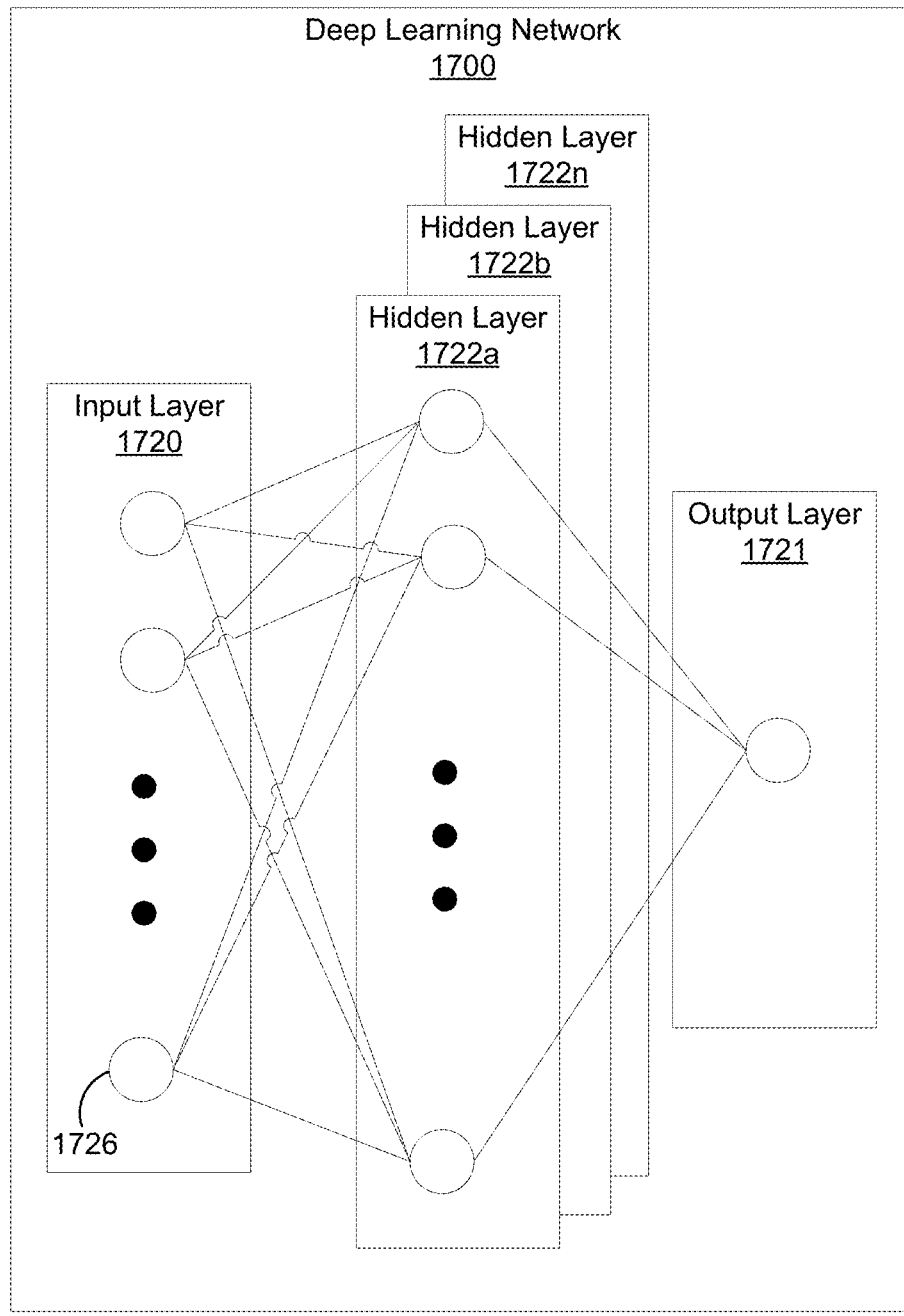
FIG. 17 is a block diagram illustrating an example of a deep learning network, in accordance with some examples.

As noted above, various aspects of the present disclosure can use machine learning models or systems. FIG. 17 is an illustrative example of a deep learning neural network 1700 that can be used to implement machine learning based feature extraction and/or activity recognition (or classification). In one illustrative example, feature extraction and/or activity recognition can be used by a discriminator network during training of a guided domain transform model (e.g., as described with respect to FIG. 5A) and/or guided super-resolution model (e.g., as described with respect to FIG. 9) utilizing a GAN as described above. An input layer 1720 includes input data. In one illustrative example, the input layer 1720 can include data representing the pixels of an input video frame. The neural network 1700 includes multiple hidden layers 1722a, 1722b, through 1722n. The hidden layers 1722a, 1722b, through 1722n include "n" number of hidden layers, where "n" is an integer greater than or equal to one. The number of hidden layers can be made to include as many layers as needed for the given application. The neural network 1700 further includes an output layer 1721 that provides an output resulting from the processing performed by the hidden layers 1722a, 1722b, through 1722n. In one illustrative example, the output layer 1721 can provide a classification for an object in an input video frame. The classification can include a class identifying the type of activity (e.g., looking up, looking down, closing eyes, yawning, etc.).

The neural network 1700 is a multi-layer neural network of interconnected nodes. Each node can represent a piece of information. Information associated with the nodes is shared among the different layers and each layer retains information as information is processed. In some cases, the neural network 1700 can include a feed-forward network, in which case there are no feedback connections where outputs of the network are fed back into itself. In some cases, the neural network 1700 can include a recurrent neural network, which can have loops that allow information to be carried across nodes while reading in input.

Information can be exchanged between nodes through node-to-node interconnections between the various layers. Nodes of the input layer 1720 can activate a set of nodes in the first hidden layer 1722a. For example, as shown, each of the input nodes of the input layer 1720 is connected to each of the nodes of the first hidden layer 1722a. The nodes of the first hidden layer 1722a can transform the information of each input node by applying activation functions to the input node information. The information derived from the transformation can then be passed to and can activate the nodes of the next hidden layer 1722b, which can perform their own designated functions. Example functions include convolutional, up-sampling, data transformation, and/or any other suitable functions. The output of the hidden layer 1722b can then activate nodes of the next hidden layer, and so on. The output of the last hidden layer 1722n can activate one or more nodes of the output layer 1721, at which an output is provided. In some cases, while nodes (e.g., node 1726) in the neural network 1700 are shown as having multiple output lines, a node has a single output and all lines shown as being output from a node represent the same output value.

In some cases, each node or interconnection between nodes can have a weight that is a set of parameters derived from the training of the neural network 1700. Once the neural network 1700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 1700 to be adaptive to inputs and able to learn as more and more data is processed.

The neural network 1700 is pre-trained to process the features from the data in the input layer 1720 using the different hidden layers 1722a, 1722b, through 1722n in order to provide the output through the output layer 1721. In an example in which the neural network 1700 is used to identify activities being performed by a driver in frames, the neural network 1700 can be trained using training data that includes both frames and labels, as described above. For instance, training frames can be input into the network, with each training frame having a label indicating the features in the frames (for the feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 1700 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 1700 is trained well enough so that the weights of the layers are accurately tuned.

For the example of identifying objects in frames, the forward pass can include passing a training frame through the neural network 1700. The weights are initially randomized before the neural network 1700 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 1700, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1700 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1700 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 1700 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1700 can include any other deep network other than a CNN, such as an autoencoder, a deep belief nets (DBNs), a Recurrent Neural Networks (RNNs), among others.

Figure 18:
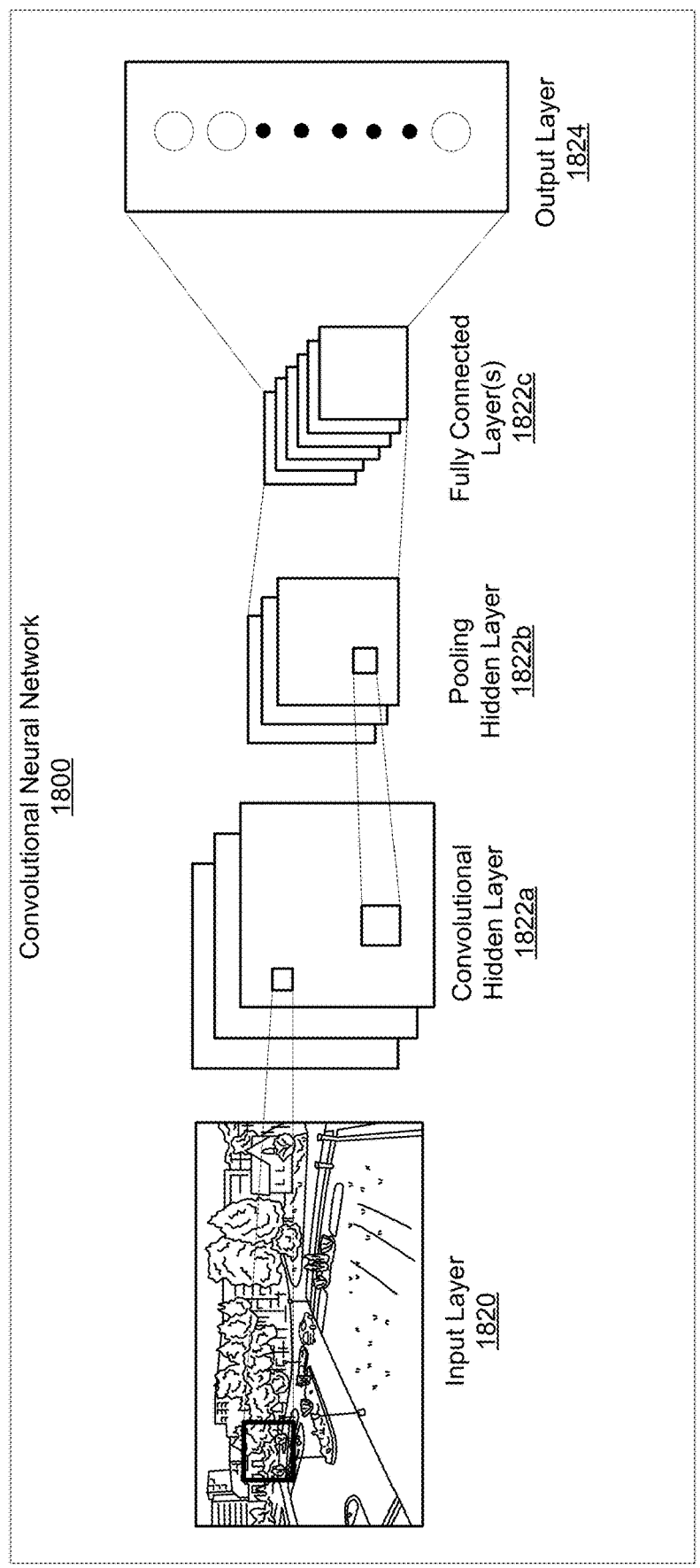
FIG. 18 is a block diagram illustrating an example of a convolutional neural network, in accordance with some examples.

FIG. 18 is an illustrative example of a convolutional neural network (CNN) 1800. The input layer 1820 of the CNN 1800 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1822a, an optional non-linear activation layer, a pooling hidden layer 1822b, and fully connected hidden layers 1822c to get an output at the output layer 1824. While only one of each hidden layer is shown in FIG. 18, one of ordinary skill will appreciate that multiple convolutional hidden layers, non-linear layers, pooling hidden layers, and/or fully connected layers can be included in the CNN 1800. As previously described, the output can indicate a single class of an object or can include a probability of classes that best describe the object in the image.

The first layer of the CNN 1800 is the convolutional hidden layer 1822a. The convolutional hidden layer 1822a analyzes the image data of the input layer 1820. Each node of the convolutional hidden layer 1822a is connected to a region of nodes (pixels) of the input image called a receptive field. The convolutional hidden layer 1822a can be considered as one or more filters (each filter corresponding to a different activation or feature map), with each convolutional iteration of a filter being a node or neuron of the convolutional hidden layer 1822a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1822a. Each connection between a node and a receptive field for that node learns a weight and, in some cases, an overall bias such that each node learns to analyze its particular local receptive field in the input image. Each node of the hidden layer 1822a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1822a is due to each node of the convolutional layer being applied to its corresponding receptive field. For example, a filter of the convolutional hidden layer 1822a can begin in the top-left corner of the input image array and can convolve around the input image. As noted above, each convolutional iteration of the filter can be considered a node or neuron of the convolutional hidden layer 1822a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1822a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1822a.

The mapping from the input layer to the convolutional hidden layer 1822a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1822a can include several activation maps in order to identify multiple features in an image. The example shown in FIG. 18 includes three activation maps. Using three activation maps, the convolutional hidden layer 1822a can detect three different kinds of features, with each feature being detectable across the entire image.

In some examples, a non-linear hidden layer can be applied after the convolutional hidden layer 1822a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1800 without affecting the receptive fields of the convolutional hidden layer 1822a.

The pooling hidden layer 1822b can be applied after the convolutional hidden layer 1822a (and after the non-linear hidden layer when used). The pooling hidden layer 1822b is used to simplify the information in the output from the convolutional hidden layer 1822a. For example, the pooling hidden layer 1822b can take each activation map output from the convolutional hidden layer 1822a and generates a condensed activation map (or feature map) using a pooling function. Max-pooling is one example of a function performed by a pooling hidden layer. Other forms of pooling functions be used by the pooling hidden layer 1822a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1822a. In the example shown in FIG. 18, three pooling filters are used for the three activation maps in the convolutional hidden layer 1822a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1822a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1822a having a dimension of 24×24 nodes, the output from the pooling hidden layer 1822b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1800.

The final layer of connections in the network is a fully-connected layer that connects every node from the pooling hidden layer 1822b to every one of the output nodes in the output layer 1824. Using the example above, the input layer includes 28×28 nodes encoding the pixel intensities of the input image, the convolutional hidden layer 1822a includes 3×24×24 hidden feature nodes based on application of a 5×5 local receptive field (for the filters) to three activation maps, and the pooling hidden layer 1822b includes a layer of 3×12×12 hidden feature nodes based on application of max-pooling filter to 2×2 regions across each of the three feature maps. Extending this example, the output layer 1824 can include ten output nodes. In such an example, every node of the 3×12×12 pooling hidden layer 1822b is connected to every node of the output layer 1824.

The fully connected layer 1822c can obtain the output of the previous pooling hidden layer 1822b (which should represent the activation maps of high-level features) and determines the features that most correlate to a particular class. For example, the fully connected layer 1822c layer can determine the high-level features that most strongly correlate to a particular class, and can include weights (nodes) for the high-level features. A product can be computed between the weights of the fully connected layer 1822c and the pooling hidden layer 1822b to obtain probabilities for the different classes. For example, if the CNN 1800 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1824 can include an M-dimensional vector (in the prior example, M=10). M indicates the number of classes that the CNN 1800 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 19:
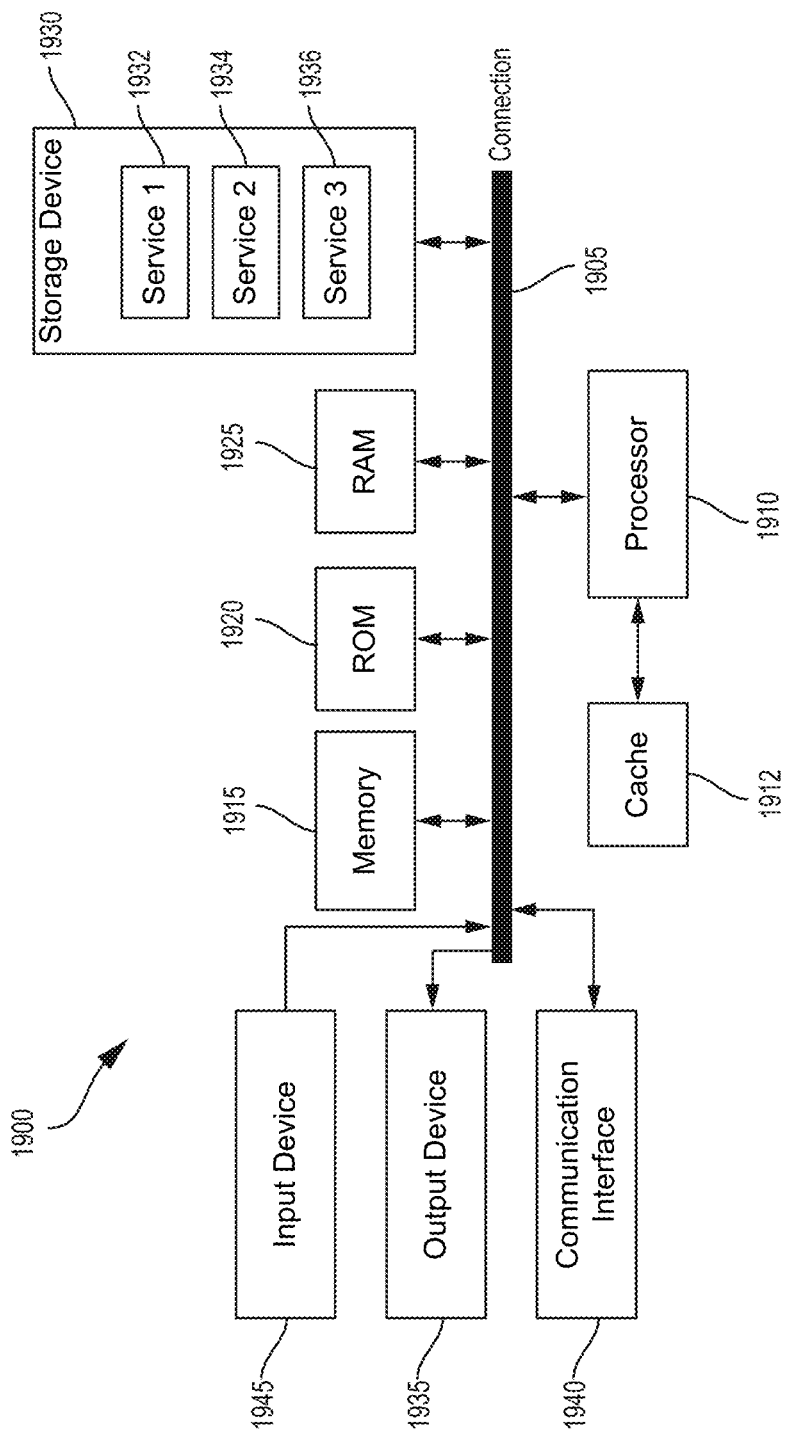
FIG. 19 is a diagram illustrating an example of a computing system for implementing certain aspects described herein.

FIG. 19 is a diagram illustrating an example of a system for implementing certain aspects of the present technology. In particular, FIG. 19 illustrates an example of computing system 1900, which can be for example any computing device making up internal computing system, a remote computing system, a camera, or any component thereof in which the components of the system are in communication with each other using connection 1905. Connection 1905 can be a physical connection using a bus, or a direct connection into processor 1910, such as in a chipset architecture. Connection 1905 can also be a virtual connection, networked connection, or logical connection.

In some embodiments, computing system 1900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1900 includes at least one processing unit (CPU or processor) 1910 and connection 1905 that couples various system components including system memory 1915, such as read-only memory (ROM) 1920 and random access memory (RAM) 1925 to processor 1910. Computing system 1900 can include a cache 1912 of high-speed memory connected directly with, in close proximity to, or integrated as part of processor 1910.

Processor 1910 can include any general purpose processor and a hardware service or software service, such as services 1932, 1934, and 1936 stored in storage device 1930, configured to control processor 1910 as well as a special-purpose processor where software instructions are incorporated into the actual processor design. Processor 1910 may essentially be a completely self-contained computing system, containing multiple cores or processors, a bus, memory controller, cache, etc. A multi-core processor may be symmetric or asymmetric.

To enable user interaction, computing system 1900 includes an input device 1945, which can represent any number of input mechanisms, such as a microphone for speech, a touch-sensitive screen for gesture or graphical input, keyboard, mouse, motion input, speech, etc. Computing system 1900 can also include output device 1935, which can be one or more of a number of output mechanisms. In some instances, multimodal systems can enable a user to provide multiple types of input/output to communicate with computing system 1900. Computing system 1900 can include communications interface 1940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1940 may also include one or more Global Navigation Satellite System (GNSS) receivers or transceivers that are used to determine a location of the computing system 1900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1930 can include software services, servers, services, etc., that when the code that defines such software is executed by the processor 1910, it causes the system to perform a function. In some embodiments, a hardware service that performs a particular function can include the software component stored in a computer-readable medium in connection with the necessary hardware components, such as processor 1910, connection 1905, output device 1935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method for processing one or more frames, comprising: obtaining a first plurality of frames associated with a first settings domain from an image capture system, wherein the first plurality of frames is captured prior to obtaining a capture input; obtaining at least one reference frame associated with a second settings domain from the image capture system, wherein the at least one reference frame is captured proximate to obtaining the capture input; obtaining a second plurality of frames associated with the second settings domain from the image capture system, wherein the second plurality of frames is captured after the at least one reference frame; and based on the at least one reference frame, transforming at least a portion of the first plurality of frames to generate a transformed plurality of frames associated with the second settings domain.

Aspect 2: The method of Aspect 1, wherein: the first settings domain comprises a first resolution; the second settings domain comprises a second resolution; and transforming at least the portion of the first plurality of frames comprises upscaling at least the portion of the first plurality of frames from the first resolution to the second resolution to generate the transformed plurality of frames, wherein the transformed plurality of frames have the second resolution.

Aspect 3: The method of any of Aspects 1 to 2, further comprising: obtaining an additional reference frame having the second resolution from the image capture system, wherein the additional reference frame is captured prior to obtaining the capture input, wherein generating the upscaled plurality of frames having the second resolution is based on at least the portion of the first plurality of frames, the at least one reference frame, and the additional reference frame, and wherein the at least one reference frame provides a reference for upscaling at least a first portion of at least the portion of the first plurality of frames and the additional reference frame provides a reference for upscaling at least a second portion of at least the portion of the first plurality of frames.

Aspect 4: The method of any of Aspects 1 to 3, further comprising: combining the transformed plurality of frames and the second plurality of frames to generate a video associated with the second settings domain.

Aspect 5: The method of any of Aspects 1 to 4, further comprising: obtaining motion information associated with the first plurality of frames, wherein generating the transformed plurality of frames associated with the second settings domain is based on at least the portion of the first plurality of frames, the at least one reference frame, and the motion information.

Aspect 6: The method of any of Aspects 1 to 5, further comprising: determining a panning direction based on the motion information associated with the first plurality of frames; and applying the panning direction to the transformed plurality of frames.

Aspect 7: The method of any of Aspects 1 to 6, wherein: the first settings domain comprises a first framerate; the second settings domain comprises a second framerate; and transforming at least the portion of the first plurality of frames comprises framerate converting at least the portion of the first plurality of frames from the first framerate to the second framerate.

Aspect 8: The method of any of Aspects 1 to 7, wherein a first subset of the first plurality of frames is captured at the first framerate and a second subset of the first plurality of frames is captured at a third framerate, different from the first framerate, wherein the third framerate is equal to or not equal to the second framerate, and wherein a change between the first framerate and the third framerate is based at least in part on motion information associated at least one of the first subset of the first plurality of frames and the second subset of the first plurality of frames.

Aspect 9: The method of any of Aspects 1 to 8, wherein: the first settings domain comprises a first resolution and a first framerate; the second settings domain comprises a second resolution and a second framerate; and transforming at least the portion of the first plurality of frames comprises upscaling at least the portion of the first plurality of frames from the first resolution to the second resolution and framerate converting at least the portion of the first plurality of frames from the first framerate to the second framerate.

Aspect 10: The method of any of Aspects 1 to 9, further comprising: obtaining an additional reference frame associated with the second settings domain from the image capture system, wherein the additional reference frame is captured prior to obtaining the capture input, wherein generating the transformed plurality of frames associated with the second settings domain is based on at least the portion of the first plurality of frames, at least one reference frame, and the additional reference frame, and wherein the at least one reference frame provides a reference for transforming at least a first subset of at least the portion of the first plurality of frames and the additional reference frame provides a reference for transforming at least a second subset of at least the portion of the first plurality of frames.

Aspect 11: The method of any of Aspects 1 to 10, wherein the at least one reference frame comprises a first reference frame, the method further comprising: obtaining a second reference frame associated with the second settings domain from the image capture system, wherein the second reference frame is captured proximate to obtaining the capture input; based on the first reference frame, transforming at least the portion of the first plurality of frames to generate the transformed plurality of frames associated with the second settings domain; and based on the second reference frame, transforming at least another portion of the first plurality of frames to generate a second transformed plurality of frames associated with the second settings domain.

Aspect 12: The method of any of Aspects 1 to 11, further comprising: obtaining a motion estimate associated with the first plurality of frames; obtaining a third reference frame associated with the second settings domain from the image capture system, wherein the third reference frame is captured prior to obtaining the capture input; and based on the third reference frame, transforming a third portion of the first plurality of frames to generate a third transformed plurality of frames associated with the second settings domain; wherein an amount of time between the first reference frame and the third reference frame is based on the motion estimate associated with the first plurality of frames.

Aspect 13: The method of any of Aspects 1 to 12, wherein the first settings domain comprises at least one of a first resolution, a first framerate, a first color depth, a first noise reduction technique, a first edge enhancement technique, a first image stabilization technique, and a first color correction technique; and the second settings domain comprises at least one of a second resolution, a second framerate, a second color depth, a second noise reduction technique, a second edge enhancement technique, a second image stabilization technique, and a second color correction technique.

Aspect 14: The method of any of Aspects 1 to 13, further comprising: generating the transformed plurality of frames using a trainable neural network, wherein the neural network is trained using a training dataset comprising pairs of images, each pair of images including a first image associated with the first settings domain and a second image associated with the second settings domain.

Aspect 15: The method of any of Aspects 1 to 14, wherein capturing the at least one reference frame proximate to obtaining the capture input comprises capturing a first available associated with the second settings domain after the capture input is received, capturing a second available frame associated with the second settings domain after the capture input is received, capturing a third available frame associated with the second settings domain after the capture input is received, or capturing a fourth available frame associated with the second settings domain after the capture input is received.

Aspect 16: The method of any of Aspects 1 to 15, wherein capturing the at least one reference frame proximate to obtaining the capture input comprises capturing a frame associated with the second settings domain within 10 millisecond (ms), within 100 ms, within 500 ms, or within 1000 ms after the capture input is received.

Aspect 17: An apparatus for processing one or more frames, comprising: at least one memory; and one or more processors coupled to the at least one memory and configured to: obtain a first plurality of frames associated with a first settings domain from an image capture system, wherein the first plurality of frames is captured prior to obtaining a capture input, obtain at least one reference frame associated with a second settings domain from the image capture system, wherein the at least one reference frame is captured proximate to obtaining the capture input, obtain a second plurality of frames associated with the second settings domain from the image capture system, wherein the second plurality of frames is captured after the at least one reference frame, and based on the at least one reference frame, transform at least a portion of the first plurality of frames to generate a transformed plurality of frames associated with the second settings domain.

Aspect 18: The apparatus of Aspect 17, wherein: the first settings domain comprises a first resolution; the second settings domain comprises a second resolution; and, to transform at least the portion of the first plurality of frames, the one or more processors are configured to upscale at least the portion of the first plurality of frames from the first resolution to the second resolution to generate the transformed plurality of frames, wherein the transformed plurality of frames have the second resolution.

Aspect 19: The apparatus of any of Aspects 17 to 18, wherein the one or more processors are configured to: obtain an additional reference frame having the second resolution from the image capture system, wherein the additional reference frame is captured prior to obtaining the capture input, wherein generating the upscaled plurality of frames having the second resolution is based on at least the portion of the first plurality of frames, the at least one reference frame, and the additional reference frame, and wherein the at least one reference frame provides a reference for upscaling at least a first portion of at least the portion of the first plurality of frames and the additional reference frame provides a reference for upscaling at least a second portion of at least the portion of the first plurality of frames.

Aspect 20: The apparatus of any of Aspects 17 to 19, wherein the one or more processors are configured to: combine the transformed plurality of frames and the second plurality of frames to generate a video associated with the second settings domain.

Aspect 21: The apparatus of any of Aspects 17 to 20, wherein the one or more processors are configured to: obtain motion information associated with the first plurality of frames, wherein generating the transformed plurality of frames associated with the second settings domain is based on at least the portion of the first plurality of frames, the at least one reference frame, and the motion information.

Aspect 22: The apparatus of any of Aspects 17 to 21, wherein the one or more processors are configured to: determine a panning direction based on the motion information associated with the first plurality of frames; and apply the panning direction to the transformed plurality of frames.

Aspect 23: The apparatus of any of Aspects 17 to 22, wherein: the first settings domain comprises a first framerate; the second settings domain comprises a second framerate; and to transform at least the portion of the first plurality of frames, the one or more processors are configured to framerate convert at least the portion of the first plurality of frames from the first framerate to the second framerate.

Aspect 24: The apparatus of any of Aspects 17 to 23, wherein a first subset of the first plurality of frames is captured at the first framerate and a second subset of the first plurality of frames is captured at a third framerate, different from the first framerate, wherein the third framerate is equal to or not equal to the second framerate, and wherein a change between the first framerate and the third framerate is based at least in part on motion information associated at least one of the first subset of the first plurality of frames and the second subset of the first plurality of frames.

Aspect 25: The apparatus of any of Aspects 17 to 24, wherein: the first settings domain comprises a first resolution and a first framerate; the second settings domain comprises a second resolution and a second framerate; and to transform at least the portion of the first plurality of frames, the one or more processors are configured to upscale at least the portion of the first plurality of frames from the first resolution to the second resolution and framerate convert at least the portion of the first plurality of frames from the first framerate to the second framerate.

Aspect 26: The apparatus of any of Aspects 17 to 25, wherein the one or more processors are configured to: obtain an additional reference frame associated with the second settings domain from the image capture system, wherein the additional reference frame is captured prior to obtaining the capture input, generating the transformed plurality of frames associated with the second settings domain is based on at least the portion of the first plurality of frames, at least one reference frame, and the additional reference frame, and wherein the at least one reference frame provides a reference for transforming at least a first subset of at least the portion of the first plurality of frames and the additional reference frame provides a reference for transforming at least a second subset of at least the portion of the first plurality of frames.

Aspect 27: The apparatus of any of Aspects 17 to 26, wherein the one or more processors are configured to: obtain a second reference frame associated with the second settings domain from the image capture system, wherein the second reference frame is captured proximate to obtaining the capture input; based on the first reference frame, transform at least the portion of the first plurality of frames to generate the transformed plurality of frames associated with the second settings domain; and based on the second reference frame, transform at least another portion of the first plurality of frames to generate a second transformed plurality of frames associated with the second settings domain.

Aspect 28: The apparatus of any of Aspects 17 to 27, wherein the one or more processors are configured to: obtain a motion estimate associated with the first plurality of frames; and obtain a third reference frame associated with the second settings domain from the image capture system, wherein the third reference frame is captured prior to obtaining the capture input; and based on the third reference frame, transform a third portion of the first plurality of frames to generate a third transformed plurality of frames associated with the second settings domain; wherein an amount of time between the first reference frame and the third reference frame is based on the motion estimate associated with the first plurality of frames.

Aspect 29: The apparatus of any of Aspects 17 to 28, wherein the first settings domain comprises at least one of a first resolution, a first framerate, a first color depth, a first noise reduction technique, a first edge enhancement technique, a first image stabilization technique, and a first color correction technique, and the second settings domain comprises at least one of a second resolution, a second framerate, a second color depth, a second noise reduction technique, a second edge enhancement technique, a second image stabilization technique, and a second color correction technique.

Aspect 30: The apparatus of any of Aspects 17 to 29, wherein the one or more processors are configured to: generate the transformed plurality of frames use a trainable neural network, wherein the neural network is trained using a training dataset comprising pairs of images, each pair of images including a first image associated with the first settings domain and a second image associated with the second settings domain.

Aspect 31: The apparatus of any of Aspects 17 to 30, wherein, to capture the at least one reference frame proximate to obtaining the capture input, the one or more processors are configured to: capture a first available associated with the second settings domain after the capture input is received; capture a second available frame associated with the second settings domain after the capture input is received; capture a third available frame associated with the second settings domain after the capture input is received; or capture a fourth available frame associated with the second settings domain after the capture input is received.

Aspect 32: The apparatus of any of Aspects 17 to 31, wherein, to capture the at least one reference frame proximate to obtaining the capture input, the one or more processors are configured to capture a frame associated with the second settings domain within 10 millisecond (ms), within 100 ms, within 500 ms, or within 1000 ms after the capture input is received.

Aspect 33: A non-transitory computer-readable storage medium having stored thereon instructions which, when executed by one or more processors, cause the one or more processors to perform any of the operations of aspects 1 to 32.

Aspect 34: An apparatus comprising means for performing any of the operations of aspects 1 to 32.

Aspect 35: A method for processing one or more frames comprising: obtaining a first plurality of frames associated with a first settings domain from an image capture system, wherein the first plurality of frames is captured prior to obtaining a capture input; obtaining a reference frame associated with a second settings domain from the image capture system, wherein the reference frame is captured proximate to obtaining the capture input; obtaining a selection of one or more selected frames associated with the first plurality of frames; and based on the reference frame, transforming the one or more selected frames to generate one or more transformed frames associated with the second settings domain.

Aspect 36: The method of Aspect 35, wherein selection of one or more selected frames is based on a selection from a user interface.

Aspect 37: The method of any of Aspects 35 to 36, wherein the user interface comprises a thumbnail gallery, a slider, or a frame-by-frame review.

Aspect 38: An apparatus for processing one or more frames, comprising: at least one memory; and one or more processors coupled to the at least one memory and configured to: obtain a first plurality of frames associated with a first settings domain from an image capture system, wherein the first plurality of frames is captured prior to obtaining a capture input, obtain a reference frame associated with a second settings domain from the image capture system, wherein the reference frame is captured proximate to obtaining the capture input, obtain a selection of one or more selected frames associated with the first plurality of frames, and based on the reference frame, transform the one or more selected frames to generate one or more transformed frames associated with the second settings domain.

Aspect 39: The apparatus of Aspect 38, wherein selection of one or more selected frames is based on a selection from a user interface.

Aspect 40: The apparatus of any of Aspects 38 to 39, wherein the user interface comprises a thumbnail gallery, a slider, or a frame-by-frame review.

Aspect 41: A non-transitory computer-readable storage medium having stored thereon instructions which, when executed by one or more processors, cause the one or more processors to perform any of the operations of aspects 35 to 40.

Aspect 42: An apparatus comprising means for performing any of the operations of aspects 35 to 40.

Aspect 43: A method comprising operations according to any of Aspects 1 to 32 and any of Aspects 35 to 40.

Aspect 44: An apparatus for processing one or more frames. The apparatus includes at least one memory (e.g., implemented in circuitry) configured to store one or more frames and one or more processors (e.g., one processor or multiple processors) coupled to the at least one memory. The one or more processors are configured to perform operations according to any of Aspects 1 to 32 and any of Aspects 35-40.

Aspect 45: A computer-readable storage medium storing instructions that, when executed by one or more processors, cause the one or more processors to perform operations according to any of Aspects 26 to 35 and any of Aspects 36 to 43.

Aspect 46: An apparatus comprising means for performing operations according to any of Aspects 26 to 37 and any of Aspects 38 to 45.

What is claimed is:

1. A method for processing one or more frames, comprising:
    obtaining a first plurality of frames from an image capture system, wherein the first plurality of frames is captured prior to obtaining a capture input;
    obtaining at least one additional frame in response to the capture input;
    determining a change of at least one frame relative to one or more frames captured in temporal proximity to the at least one frame;
    displaying, based on determining the change of the at least one frame, at least one suggested frame in an interface for selecting at least one selected frame, each selected frame associated with one or more frames of the first plurality of frames;
    receiving, by the interface, a selection of the at least one selected frame; and
    based on the selection, generating an image based on the at least one selected frame and the at least one additional frame.

2. The method of claim 1, wherein the at least one additional frame is obtained from an additional image capture system different from the image capture system.

3. The method of claim 1, wherein the interface comprises one or more of a slider for advancing through frames or a gallery corresponding to the first plurality of frames.

4. The method of claim 1, wherein the first plurality of frames is stored in a frame buffer.

5. The method of claim 1, further comprising determining at least one additional selected frame associated with one or more frames of the first plurality of frames, wherein determining the at least one additional selected frame comprises one or more of:
    determining a change of the at least one additional selected frame relative to one or more frames captured in temporal proximity to the at least one additional selected frame;
    determining that an amount of motion in the at least one additional selected frame exceeds a motion threshold;
    determining that the at least one additional frame contains relevant content;
    determining that the at least one additional frame contains a human face; or
    processing the at least one additional selected frame by a neural network.

6. The method of claim 1, further comprising:
    determining that an amount of motion in the at least one frame exceeds a motion threshold; and
    displaying the at least one suggested frame based on determining that the amount of motion in the at least one frame exceeds the motion threshold.

7. The method of claim 1, wherein the at least one suggested frame is generated using a deep learning neural network.

8. The method of claim 1, wherein:
    the at least one selected frame is associated with a first settings domain;
    the at least one additional frame is associated with a second settings domain; and
    generating the image comprises transforming the at least one selected frame from the first settings domain to the second settings domain.

9. The method of claim 8, wherein:
    the first settings domain comprises a first resolution;
    the second settings domain comprises a second resolution; and
    transforming the at least one selected frame from the first settings domain to the second settings domain comprises upscaling the at least one selected frame from the first resolution to the second resolution.

10. The method of claim 8, wherein:
    the first settings domain comprises a first framerate;
    the second settings domain comprises a second framerate; and
    transforming the at least one selected frame from the first settings domain to the second settings domain comprises framerate converting the at least one selected frame from the first framerate to the second framerate.

11. The method of claim 8, wherein:
the first settings domain comprises a first resolution and a first framerate;
the second settings domain comprises a second resolution and a second framerate; and
transforming the at least one selected frame from the first settings domain to the second settings domain comprises upscaling the at least one selected frame from the first resolution to the second resolution and framerate converting the at least one selected frame from the first framerate to the second framerate.

12. The method of claim 1, wherein displaying the interface for selecting the at least one selected frame comprises displaying one or more frames of the first plurality of frames.

13. The method of claim 1, wherein the at least one selected frame includes a frame selected from the first plurality of frames.

14. The method of claim 1, wherein the at least one additional frame is a keyframe.

15. An apparatus for processing one or more frames, comprising:
a memory; and
one or more processors coupled to the memory and configured to:
obtain a first plurality of frames from an image capture system, wherein the first plurality of frames is captured prior to obtaining a capture input;
obtain at least one additional frame in response to the capture input;
determine a change of at least one frame relative to one or more frames captured in temporal proximity to the at least one frame;
display, based on a determination of the change of the at least one frame, the at least one suggested frame in an interface for selecting at least one selected frame, each selected frame associated with one or more frames of the first plurality of frames;
receive, by the interface, a selection of the at least one selected frame; and
based on the selection, generate an image based on the at least one selected frame and the at least one additional frame.

16. The apparatus of claim 15, wherein the at least one additional frame is obtained from an additional image capture system different from the image capture system.

17. The apparatus of claim 15, wherein the interface comprises one or more of a slider for advancing through frames or a gallery corresponding to the first plurality of frames.

18. The apparatus of claim 15, wherein displaying the interface for selecting the at least one selected frame comprises displaying one or more frames of the first plurality of frames.

19. The apparatus of claim 15, further comprising:
determining that an amount of motion in the at least one frame exceeds a motion threshold; and
displaying the at least one suggested frame based on determining that the amount of motion in the at least one frame exceeds the motion threshold.

20. The apparatus of claim 15, wherein the at least one suggested frame is generated using a deep learning neural network.

21. The apparatus of claim 15, wherein the at least one selected frame includes a frame selected from the first plurality of frames.

22. The apparatus of claim 15, wherein the at least one additional frame is a keyframe.

23. An apparatus for processing one or more frames, comprising:
a display;
an image capture system;
a memory; and
one or more processors coupled to the memory and configured to:
obtain a first plurality of frames from the image capture system, wherein the first plurality of frames is captured prior to obtaining a capture input;
obtain at least one additional frame in response to the capture input;
determine a change of at least one frame relative to one or more frames captured in temporal proximity to the at least one frame;
display, by the display based on a determination of the change of the at least one frame, at least one suggested frame in an interface for selecting at least one selected frame, each selected frame associated with one or more frames of the first plurality of frames;
receive, by the interface, a selection of the at least one selected frame; and
based on the selection, generate an image based on the at least one selected frame and the at least one additional frame.

24. The apparatus of claim 23, wherein the at least one additional frame is obtained from an additional image capture system different from the image capture system.

25. The apparatus of claim 23, wherein the at least one additional frame is a keyframe.

* * * * *